United States Patent
Balch et al.

(10) Patent No.: US 9,489,560 B2
(45) Date of Patent: Nov. 8, 2016

(54) ON-THE GO TOUCHLESS FINGERPRINT SCANNER

(71) Applicant: Advanced Optical Systems, Inc., Huntsville, AL (US)

(72) Inventors: Michael Kevin Balch, Madison, AL (US); Stephen Harris Fox, Madison, AL (US); Richard Leon Hartman, Huntsville, AL (US); Nicholas Clark Rosetti, Huntsville, AL (US)

(73) Assignee: ADVANCED OPTICAL SYSTEMS, INC., Huntsville, AL (US)

( * ) Notice: Subject to any disclaimer, the term of this patent is extended or adjusted under 35 U.S.C. 154(b) by 92 days.

(21) Appl. No.: 14/620,238

(22) Filed: Feb. 12, 2015

(65) Prior Publication Data
US 2015/0227774 A1    Aug. 13, 2015

Related U.S. Application Data

(60) Provisional application No. 61/938,748, filed on Feb. 12, 2014, provisional application No. 62/092,494, filed on Dec. 16, 2014.

(51) Int. Cl.
*G06K 9/00* (2006.01)
(52) U.S. Cl.
CPC ....... *G06K 9/00033* (2013.01); *G06K 9/00382* (2013.01)
(58) Field of Classification Search
None
See application file for complete search history.

(56) References Cited

U.S. PATENT DOCUMENTS

| | | |
|---|---|---|
| 5,929,443 A | 7/1999 | Alfano et al. |
| 6,404,904 B1 | 6/2002 | Einighammer et al. |
| 7,397,943 B2 | 7/2008 | Merbach et al. |
| 7,587,071 B2 | 9/2009 | Einighammer et al. |
| 7,599,531 B2 | 10/2009 | Hauke et al. |
| 7,660,442 B2 | 2/2010 | Sweeney et al. |
| 7,812,963 B2 | 10/2010 | De Groot |
| 2001/0026632 A1 | 10/2001 | Tamai |
| 2001/0041073 A1 | 11/2001 | Sorek et al. |
| 2005/0226474 A1 | 10/2005 | Merbach et al. |
| 2005/0265586 A1 | 12/2005 | Rowe et al. |
| 2006/0113381 A1 | 6/2006 | Hochstein et al. |
| 2007/0040017 A1 | 2/2007 | Kozlay |

(Continued)

OTHER PUBLICATIONS

International Preliminary Report on Patentability for International Patent Application No. PCT/US2011/055192 filed Oct. 7, 2011, 6 pages.

(Continued)

*Primary Examiner* — Mark Roz
(74) *Attorney, Agent, or Firm* — Cantor Colburn LLP

(57) ABSTRACT

On-the-go fingerprint scanners and methods of capturing fingerprints on-the-go are disclosed. In some aspects, the on-the-go fingerprint scanner can include a scanning area and a beam break sensor disposed coincident to the scanning area such that the beam break sensor detects when an object passes through the scanning area. The scanner can also include at least one hand camera configured to capture a video image of the scanning area such that when the beam break sensor detects that an object has passed through the scanning area, the hand camera detects whether the object is a human hand and the location of any fingers on said hand, and at least one fingerprint camera configured to receive the location of any fingers within the scanning area from the hand camera and capture a high-resolution image of at least a portion of any of said fingers passing through the scanning area.

6 Claims, 24 Drawing Sheets

(56) References Cited

U.S. PATENT DOCUMENTS

| | | |
|---|---|---|
| 2007/0131759 A1 | 6/2007 | Cox et al. |
| 2008/0080751 A1 | 4/2008 | Bee et al. |
| 2008/0219522 A1 | 9/2008 | Hook et al. |
| 2009/0245591 A1 | 10/2009 | Rowe et al. |
| 2010/0014717 A1 | 1/2010 | Rosenkrantz |
| 2010/0165090 A1 | 7/2010 | Sweeney et al. |
| 2010/0172548 A1 | 7/2010 | Mil'Shtein et al. |
| 2011/0279663 A1 | 11/2011 | Fan et al. |
| 2012/0016798 A1 | 1/2012 | Carper |
| 2012/0076369 A1 | 3/2012 | Abramovich et al. |
| 2012/0086794 A1 | 4/2012 | Burcham et al. |

OTHER PUBLICATIONS

International Search Report for International Patent Application No. PCT/US2011/055192 filed Oct. 7, 2011.

Written Opinion for International Patent Application No. PCT/US2011/055192 filed Oct. 7, 2011.

International Search Report for International Application No. PCT/US15/15538; International Filing Date: Feb. 12, 2015; Date of Mailing Jun. 3, 2015; 7 pgs.

Written Opinion of the International Searching Authority for International Application No. PCT/US15/15538; International Filing Date: Februry 12, 2015; Date of Mailing: Jun. 3, 2015; 4 pages.

ON-THE GO TOUCHLESS FINGERPRINT SCANNER

RELATED APPLICATIONS

This application claims priority to U.S. Provisional Application No. 61/938,748 entitled "On the Go, Touchless Fingerprint Scanner" filed Feb. 12, 2014, which is hereby incorporated by reference in its entirety. This application also claims priority to U.S. Provisional Application No. 62/092,494 entitled "On the Go touch less fingerprint scanner improvements" filed on Dec. 16, 2014, which is hereby incorporated by reference in its entirety.

FIELD

The present disclosure generally relates to a biometric sensor, and more particularly, to an on-the-go, touchless fingerprint scanner.

BACKGROUND

Biometric identity management is a foundational tool used by numerous security and law enforcement agencies to provide secured access as well as to identify and track individuals under surveillance. Additionally, civilian and other organizations looking to provide secured access to physical as well as virtual systems, locations, and data utilize biometric identity management systems (i.e., "biometrics"). To that end, various biometric identity management systems are employed including retinal scanning systems, face and voice recognition systems, DNA recognition, and fingerprint matching and verification systems.

Fingerprint matching and verification form a foundational part of biometric identity management. Traditional fingerprint scanners require a subject to stop, place his hand on a scanner platen, or, an ink pad so that his fingerprints may be scanned. That is, the subject's fingers and/or hand must be static or motionless. Due to this and other constraints, traditional static fingerprint scanners suffer from long processing times.

Accordingly, there remains a need for improved fingerprint scanners and methods of capturing a subject's fingerprints while the subject is in motion ("on-the-go") and/or without requiring the subject to touch anything that can rapidly acquire fingerprints of a dynamic (i.e., moving) finger or hand.

SUMMARY

An on-the-go fingerprint scanner is disclosed that can include a scanning area and a beam break sensor disposed coincident to the scanning area such that the beam break sensor detects when an object passes through the scanning area. The scanner can also include at least one hand camera configured to capture a video image of the scanning area such that when the beam break sensor detects that an object has passed through the scanning area, the hand camera detects whether the object is a human hand and the location of any fingers on said hand, and at least one fingerprint camera configured to receive the location of any fingers within the scanning area from the hand camera and capture a high-resolution image of at least a portion of any of said fingers passing through the scanning area.

In some aspects, an on-the-go fingerprint scanner comprises a scanning area, a beam break sensor disposed coincident to the scanning area such that the beam break sensor detects when an object passes through the scanning area, and at least one hand camera configured to capture a video image of the scanning area. The hand camera can capture the video image such that when the beam break sensor detects that an object has passed through the scanning area, the hand camera acquires an image of the object, detects whether the object is a human hand by determining a contour around the perimeter of the object, applying landmark points to the contour, and comparing the contour to a previously trained Active Shape Model of a hand, and detects the location of any fingers on said detected hand by processing the location of the landmark points, and detects the presence or absence of any fingers using a neural network. Additionally, the scanner can include at least one fingerprint camera configured to receive the location of any fingers within the scanning area from the hand camera and capture a plurality of high-resolution images of at least a portion of any of said fingers passing through the scanning area.

A method of capturing a fingerprint on-the-go, can include determining that an object is passing through a predefined scanning area, and acquiring an image of the object and detecting whether the object is a human hand by determining a contour around the perimeter of the object, applying landmark points to the contour, and comparing the contour to a previously trained Active Shape Model of a hand. The method can further include detecting the location of any fingers on said detected hand by processing the location of the landmark points, and detecting the presence or absence of any fingers by applying a neural network, and acquiring at least one high-resolution image of a tip portion of any detected finger.

The above described and other features are further described by the accompanying drawings and detailed description.

BRIEF DESCRIPTION OF THE DRAWINGS

This disclosure will be more fully understood from the following detailed description taken in conjunction with the accompanying drawings, in which.

DETAILED DESCRIPTION

Figure 1:
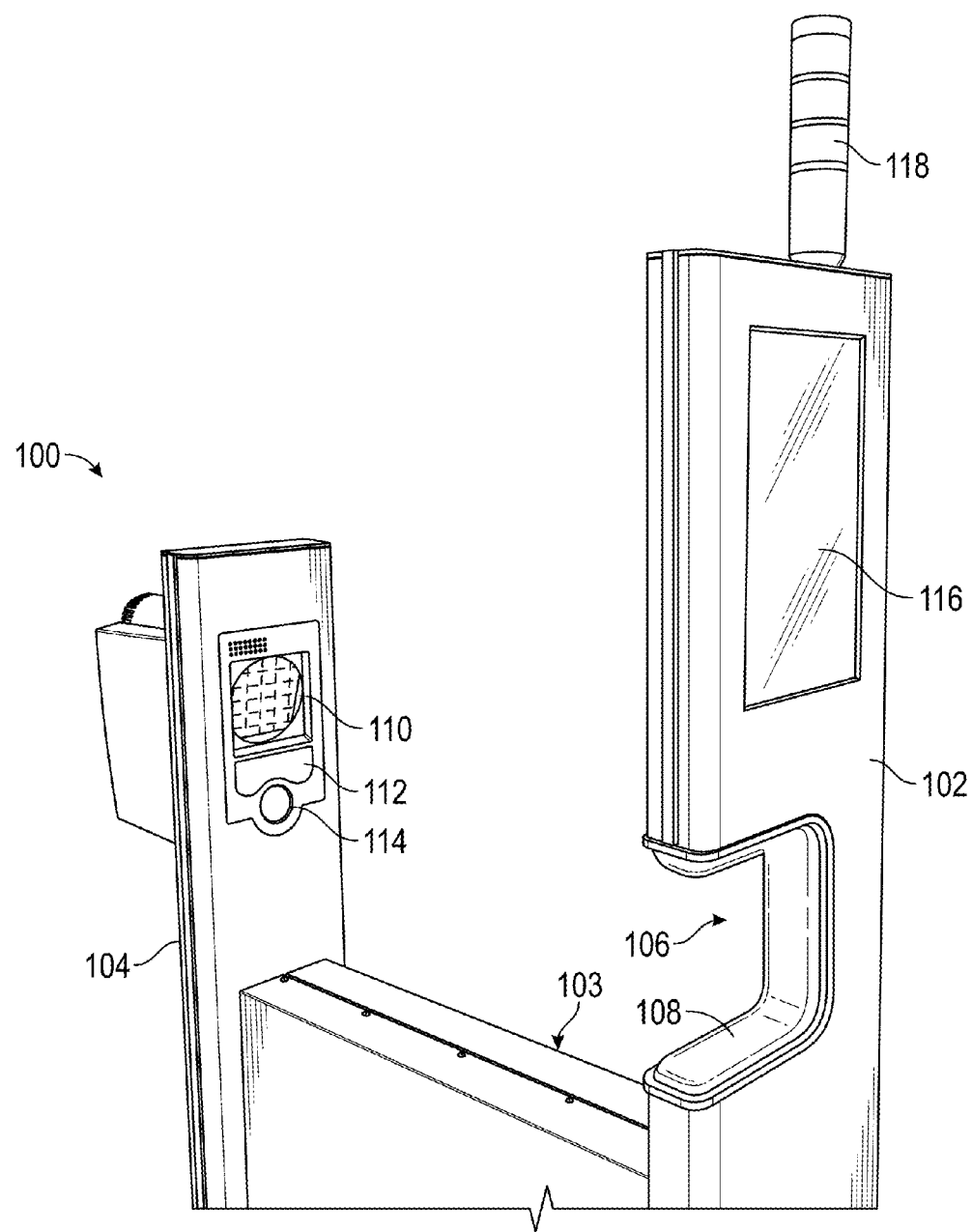
FIG. 1 is perspective view of an on-the-go fingerprint scanner.

Certain exemplary aspects will now be described to provide an overall understanding of the principles of the structure, function, manufacture, and use of the devices, systems, methods, and/or kits disclosed herein. One or more examples of these aspects are illustrated in the accompanying drawings. Those skilled in the art will understand that the devices, systems, methods, and/or kits disclosed herein and illustrated in the accompanying drawings are non-limiting and exemplary in nature and that the scope of the present invention is defined solely by the claims. The features illustrated or described in connection with any one aspect described may be combined with the features of other aspects. Such modification and variations are intended to be included within the scope of the present disclosure.

It will be appreciated by those of ordinary skill in the art that the diagrams, schematics, illustrations, and the such as represent conceptual views or processes illustrating systems and methods embodying this invention. The functions of the various elements shown in the figures can be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art will further understand that the exemplary hardware, software, processes, methods, and/or operating systems described herein are for illustrative purposes and, thus, are not intended to be limited to any particular named manufacturer.

Further in the present disclosure, like-numbered components generally have similar features, and thus each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can be determined for any geometric shape. Sizes and shapes of the systems and devices, and the components thereof, can depend at least on the size and shape of the components with which the systems and devices will be used, and the methods and procedures in which the systems and devices will be used.

Biometric scanning, including fingerprint scanning, is a critical tool utilized by security and law enforcement agencies, such as the Federal Bureau of Investigation ("FBI"). As disclosed herein, on-the-go fingerprint scanners and methods of capturing fingerprints on-the-go provide fast and reliable scanning. "On-the-go" (also referred to as "on the go" or "OTG"), as used herein, means that a desired hand or finger to be imaged and printed is in motion (i.e., dynamic or not static). That is, a subject can either be moving his or her hand, fingers, or the entire subject can be in motion, such as when a person is walking or being pushed in a wheelchair. The FBI and other organizations have established that fingerprint scanners should scan and register a minimum of 30 subjects per minute. The on-the-go fingerprint scanners and methods described herein can achieve this minimum of 30 subjects per minute and, in some aspects, the on-the-go fingerprint scanners and methods disclosed herein can reliably and accurately provide fingerprint scans of more than approximately 50 subjects per minute.

As described in greater detail below, example on-the-go fingerprint scanners can include a scanning area, a beam break sensor, and a variety of cameras for scanning a subject's fingerprints. For example, as shown in detail below, on-the-go fingerprint scanners can include a fingerprint camera (also referred to as "print camera"), one or more range sensors, one or more illumination sources, a second camera (the "hand camera" or "guidance camera"), and a display. On-the-go scanners can also include a data acquisition and processing platform, and software and algorithms for image processing.

Figure 2:
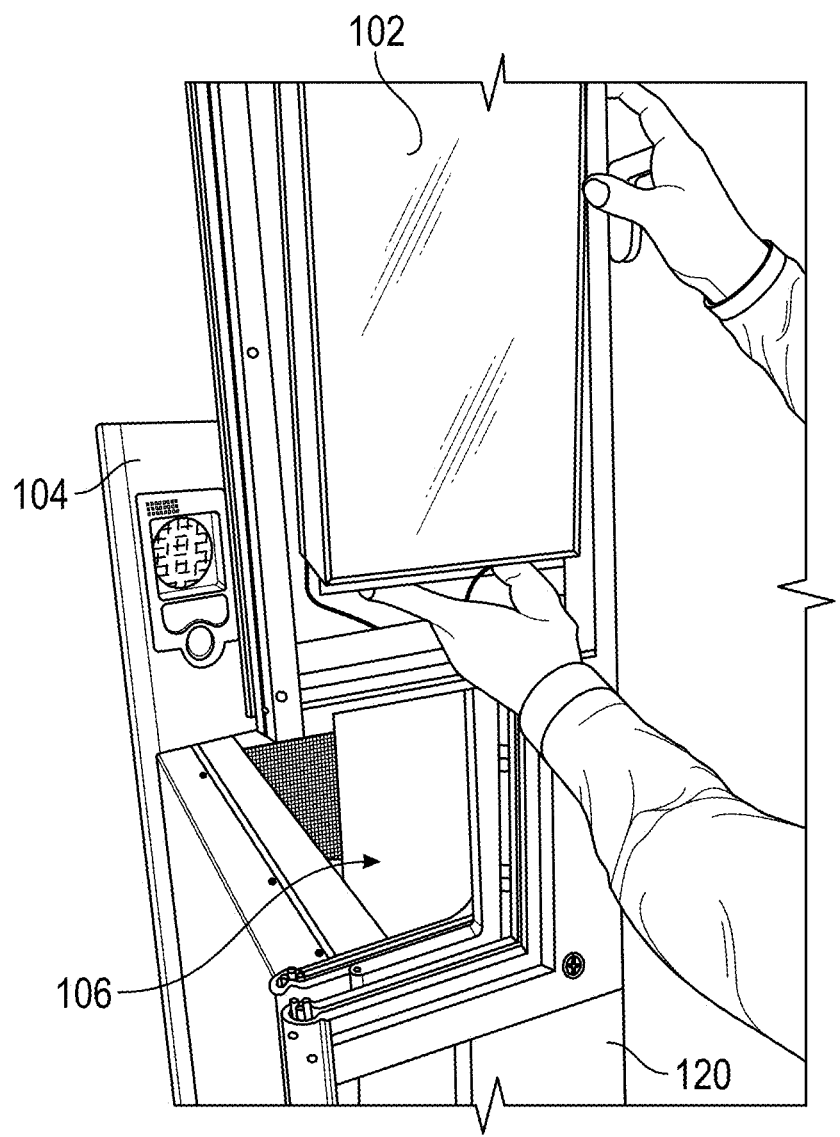
FIG. 2 is a perspective view of the on-the-go fingerprint scanner of FIG. 1.
Figure 3:
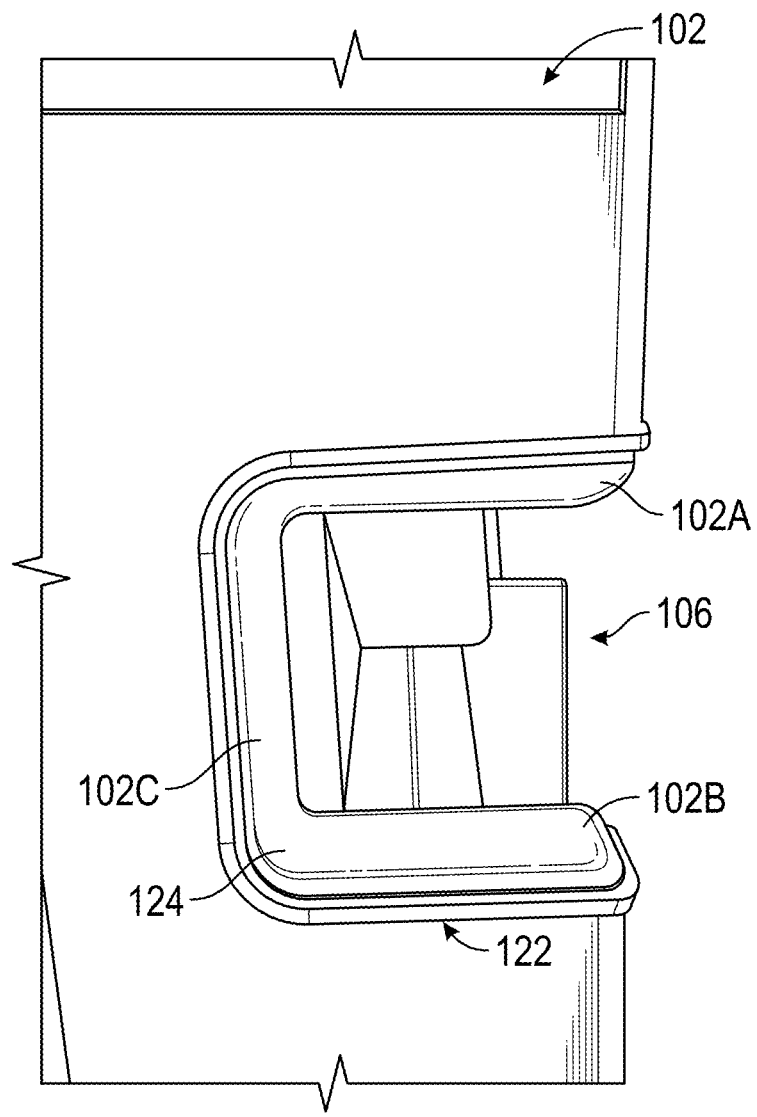
FIG. 3 is a perspective view of a scanning area of the on-the-go fingerprint scanner of FIG. 1.

FIGS. 1-3 illustrate an on-the-go fingerprint scanner. As is shown, the on-the-go fingerprint scanner 100 includes an entrance frame 102 and an imaging frame 104. The entrance frame defines a scanning area 106 and contains a beam break sensor 108 that is disposed coincidentally to the scanning area 106. The imaging frame 104 holds a lighting system 110, a fingerprint camera 112, and a hand camera system 114. As will be described herein, in some aspects, electronic systems (not shown) can be contained within the frames 102, 104 or otherwise be operatively coupled thereto.

In some aspects, the entrance frame 102 and the imaging frame 104 can be separated by a frame member 103 such that the entrance frame 102 and the imaging frame 104 are coupled to one another to maintain a specific distance. In other aspects, however, the imaging frame and entrance frame can be separated without being mechanically connected to one another. In either aspect, the imaging frame and the entrance frame can be any desired distance apart so as to allow optimum imaging of the scanning area. For example and without limitation, the imaging frame 104 can be about 5 meters or less from the entrance frame 102. In some aspects, for example, the imaging frame can be about 1 meter from the entrance frame 102. Furthermore, the entrance frame 102 can physically define the scanning area 106, as is shown in FIGS. 1-3. The entrance frame 102 can optionally hold a visual display 116 and a lane control light 118. In some aspects, the visual display 116 can be any display including a computer monitor, television, touchscreen monitor, tablet, or other display device. In some aspects, the display 116 can be used to provide instructions to a user of the fingerprint scanner, display advertising, or to display any other visual representation desired.

The scanning area 106 can be defined by the entrance frame 102, as shown in FIGS. 1-3. That is, the scanning area 106 can be a physical area that is bounded by portions of the entrance frame 102A, 102B, and 102C. Alternatively, the scanning area 106 can be a point, plane, and/or region in space that is not directly defined by the entrance frame 102. In some aspects, the fingerprint scanner can be incorporated into a system that lacks a defined entrance frame, such as an x-ray or back-scatter system used in airport security. In such an aspect, the entrance frame and scanning area can be a portion of the existing x-ray or backscatter machine. For example, in a backscatter system, the scanning area can be the area above a subjects head such that the beam break sensor is triggered as the subject raises his or her hands above their head in the normal course of operating the back-scatter system.

The beam break sensor 108 can include a commercial beam break system 120, a cueing light 122, and a cover 124. The beam break system can be, but is not limited to, a lighting source on one end, and a detector strip on the other. In some aspects the beam break sensor 108 is an infra-red beam break sensor. As mentioned above, the beam break sensor 108 can be disposed coincidentally to the scanning area. That is, the beam break sensor 108 can be disposed such that the beam break sensor 108 is triggered slightly before a subject's hand is in focus of the hand camera. This way, the hand camera can—as is discussed in detail below—determine if the object is a hand, and the fingerprint camera can begin to capture images before the hand is in focus as the hand passes through the scanning area. This can allow the fingerprint camera algorithms to monitor the focus of each finger—as detailed below—identifying which frame is best focused for each finger. In some aspects, the beam break sensor 108 is aligned longitudinally to the scanning area. The cueing light 122 can be, but is not limited to, an LED strip, with multiple color LEDs. The cover 204 can be transparent to allow the cueing light 122 to shine therethrough and soft such that if a user accidentally strikes the cover 124, the user's hand is not injured and does not cause pain.

Figure 4:
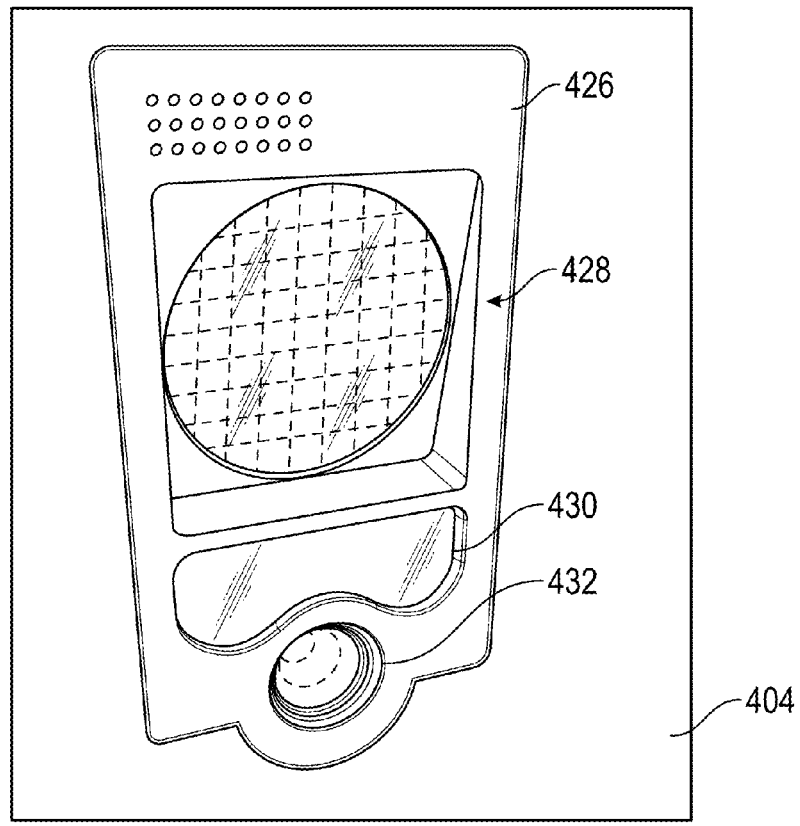
FIG. 4 is a close-up view of an imaging subsystem of the on-the-go fingerprint scanner of FIG. 1.

As shown in FIG. 4, the imaging frame 404 can include a mounting plate 426, an illumination source 428, and a plurality of cameras 430, 432. Furthermore, as described above, the imaging frame 404 can include any number of electronic systems—such as a power supply, controller, memory, and/or processor—that are configured to operate the illumination source, cameras, and any other on-the-go fingerprint scanner components described herein.

The fingerprint camera 432 can be of sufficient frame rate, resolution, and size to acquire sufficient detail of a fingerprint at a range of, for example, 10 meters or less. In some aspects, for example, the fingerprint camera can be of sufficient frame rate, resolution, and size to acquire sufficient detail of a fingerprint at a range of about 5 meters or less, about 1 meter or less, about 0.75 meters or less, about 0.5 meters or less, and/or any other desired distance. These requirements vary with application. For example and without limitation, the FBI requires that the fingerprint camera produce at least 500 pixels per inch ("PPI") of object, and that a modulation transfer function of the camera and associated lens provide at sufficient contrast at a spatial frequency of about 9.8 lp/mm on the object. Alternatively and in some aspects, the fingerprint camera can produce images having between about 100 pixels per inch ("PPI") and 10000 PPI, for example 1000 PPI.

Additionally, the camera frame rate can be any desired frame rate, for example it can be such that the depth of field of the camera is equal to or greater than the distance traveled by the subject's hand between successive frames. Depth of field is determined by pixel size, distance, and f/#. A larger f/# (smaller aperture) leads to a deeper depth of field (until the diffraction limit is reached). For example and without limitation, with a 5 micron pixel size, 100 cm focal length, at f/8, the depth of field is approximately 0.75 cm. In that scenario, with a subject's hand moving through the scanning area at a rate of approximately 1 meter/second, and 0.75 cm depth of field, a frame rate of 150 frames/second can be used to capture sufficient in-focus images. Without limitation, the camera frame rate can be in the range of approximately 20 fps to approximately 300 fps. In some aspects and without limitation, suitable frame rates can include 24 fps, 25 fps, 30 fps, 48 fps, 90 fps, 100 fps, 120 fps, 125 fps, 150 fps, and 240 fps. For example, in some aspects, the fingerprint camera (i.e., "Print Camera") is a visible, grayscale, 4096× 3072 camera, which acquires images at approximately 125 fps. For example and without limitation, a 12 Megapixel camera (with pixels of about 5.0 microns in height and width) miming at 165 frames per second (fps) can be utilized. Additionally, the camera can include a 100 mm focal length lens operating at f/8 and the plane of focus can be located approximately 750 mm from the entrance pupil of the lens.

In some aspects, the fingerprint camera can utilize an exposure time short enough to minimize the impact of lateral motion on the modulation transfer function of the system. Additionally, the fingerprint camera can utilize an exposure time short enough to minimize the impact of apparent lateral motion due to magnification change during the exposure time at the limit of the field of view. Lateral motion does, however, blur the image, but it does not affect the system's modulation transfer function as the system is configured so that the lateral motion's blur is lower than the blur caused by the system's modulation transfer function, so that image quality is not affected by lateral motion. The fingerprint camera can capture images during the hand traversal of the plane of focus (i.e., as the hand travels through the scanning area). The frame rate of the camera can be sufficient such that the best focused image of each finger occurs within a distance equivalent to a change in magnification of one percent. That is, in some aspects, the scale of the fingerprint with respect to the pixel grid is known and the magnification of the image from the object plane (the plane of focus) to the image does not change by more than one percent in order to meet certain standards in fingerprint acquisition. Thus, the plane of focus in object space can be pre-defined and known to better than one percent of the nominal range. In practice, the subject's hand might be presented to the system at an angle to the plane that is in focus. Also, subjects may present their hand in a slightly cupped manner. This means that not all the fingers are in focus at the same time. Thus, the multiple frame approach described herein can be utilized in some aspects to compensate for these issues.

The on-the-go fingerprint scanners and methods disclosed herein can ensure that the fingerprint camera takes a plurality of images during the correct window in time by detecting the range of the subject's hand from the plane of focus using one of several means of range detection. For example, when the hand reaches the distal edge of the acquisition region (i.e., scanning area), the range sensor can trigger the illumination and camera frame sequence. Thus, in some aspects, when the hand leaves the region of acquisition, the illumination turns off and the camera ceases frame acquisition. The range sensing can be provided by an infrared range sensor, and/or, an acoustic range sensor. In some aspects, the beam brake sensor described above is the range sensor.

The hand camera 430 can be a video camera and can also include an infrared ("IR") lighting system. Furthermore, in some aspects, the hand camera can be configured to function as a hand guidance system. In this aspect, the hand camera images the hand and displays both the hand and an overlay on the display. The overlay corresponds to the field of view of the fingerprint camera such that if the subject's hand aligns with the overlay, then the hand will be in the acceptable region for data acquisition by the fingerprint camera. Although this aspect is optional and not needed in all aspects, the display with the overlay and hand image allow the subject to self-correct the position of the hand as the subject approaches the data collection region.

Figure 5:
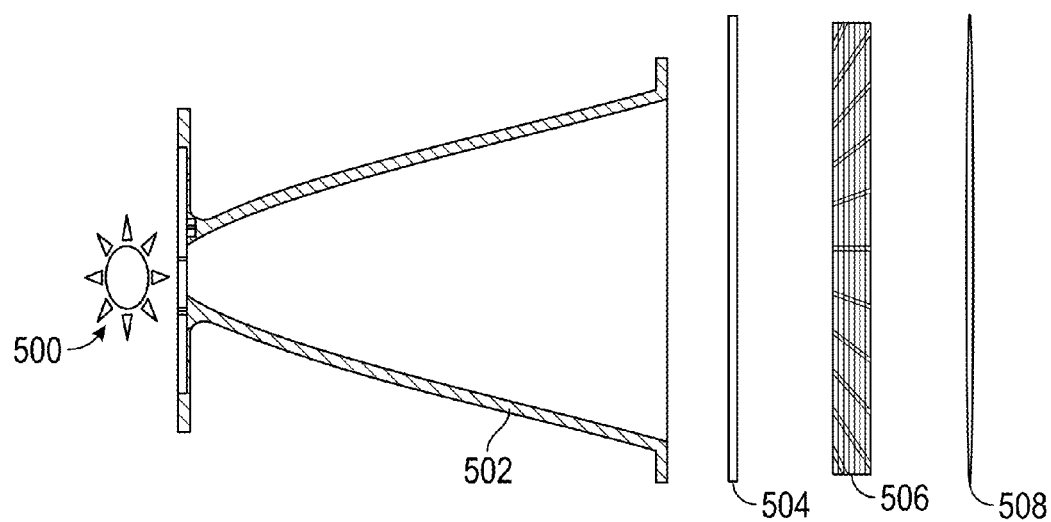
FIG. 5 is an exploded schematic view of an exemplary illumination source.

The illumination source 428 can be configured to illuminate the scanning area 106 such that a subject's hand and fingers are illuminated sufficiently to allow a camera to take an image with acceptable signal to noise ratio. As shown in FIG. 5, in some aspects, the illumination source can include a high power, extended light source 500, a compound hyperbolic concentrator (CHC) 502, a lens 504, and a diffuser 506. The illumination subsystem may also include a baffle 508. The light source can be narrow band or broad band visible source and could be an LED array, halogen, or other source of sufficient intensity and spatial distribution. In some aspects, the illumination is provided by two LED lamps that produce at least 100 klux over an area sufficient to encompass a complete hand.

The concentrator 502 is a reflecting, imaging form which exhibits particular properties. The concentrator 502 collects a high percentage of the light emitted from the source. It creates a virtual image of the emitting source in which the edges of the image are in focus while the interior of the image is out of focus. This virtual image is then imaged by the lens 504 to the field position. The diffuser 506 further diffuses the interior image to create uniform illumination over the field while minimizing light distributed outside the intended field. The baffle 508 further minimizes the possibility of light scattered from any surface in the illumination subsystem from entering a subject's or bystander's eyes.

Furthermore, it can be advantageous to operate with as large a depth of field as possible, without compromising the resolution of the system. Deconvolution may be used to extend the effective depth of field, but in many optical systems this is limited by uncertainty in the range dependent point spread function. As this system includes a range sensor, and can, in principle, be configured to track the range of each finger, we also recognize that a range dependent deconvolution operation may be performed in order to extend the depth of field, and consequently reduce the frame rate demands on the camera.

Thus, a large field of view can be desirable. This may be accomplished by several means, the simplest of which is using multiple imagers synced, and stitched such that an aggregate field of view may be obtained. In addition, using multiple cameras, cameras may be set to acquire data at different focal planes, thus trading frame rate for a multiplicity of sensors.

Figure 6:
FIG. 6 is an example binarized and grey-level fingerprint produced by the on-the-go fingerprint scanner of FIG. 1.
Figure 6:

In use, the on-the-go fingerprint scanner can produce, as shown in FIG. 6, a binarized image 602 of the subject's finger print(s), a grey-level image 604 of the subject's finger print(s), or both. To do so, an approaching subject passes his/her hand through the scanning area. This activates the beam break sensor. As an object—the subject's hand, for instance—passes through the scanning area, the beam break sensor is triggered and sends an electrical signal to the electronic system. The electronic system switches the color of the cueing light to red, indicating a need for the next person to wait. After the fingerprint camera completes its tasks, the electronic system can switch the cueing light back to green.

The beam break sensor also triggers the electronic system to examine the last frame from the hand camera video image. If the electronic system determines that the frame contains a hand, it turns on the lighting system 428 and instructs the fingerprint camera 106 to capture at least one image, or, in some aspects, a sequence of images. The resulting fingerprint image or plurality of images is processed by the electronic system using software described in more detail below.

As mentioned, the electronic system implements various algorithms to process the images received from the hand camera, and the fingerprint camera if it is determined that a hand and fingers are present. These various algorithms are described in more detail in FIGS. 7-19 below, but a person of ordinary skill in the art will understand that these algorithms are by example only and are not limiting. Additionally, a person of ordinary skill in the art will understand that the various system components can perform various aspects of the below described algorithm(s) utilizing electronic systems (such as a processor, controller, and memory) that are localized on each individual system component (i.e., the hand camera), or a system-wide controller, processor, and/or memory can operate, control, and perform the algorithm(s) described herein.

Figure 7:
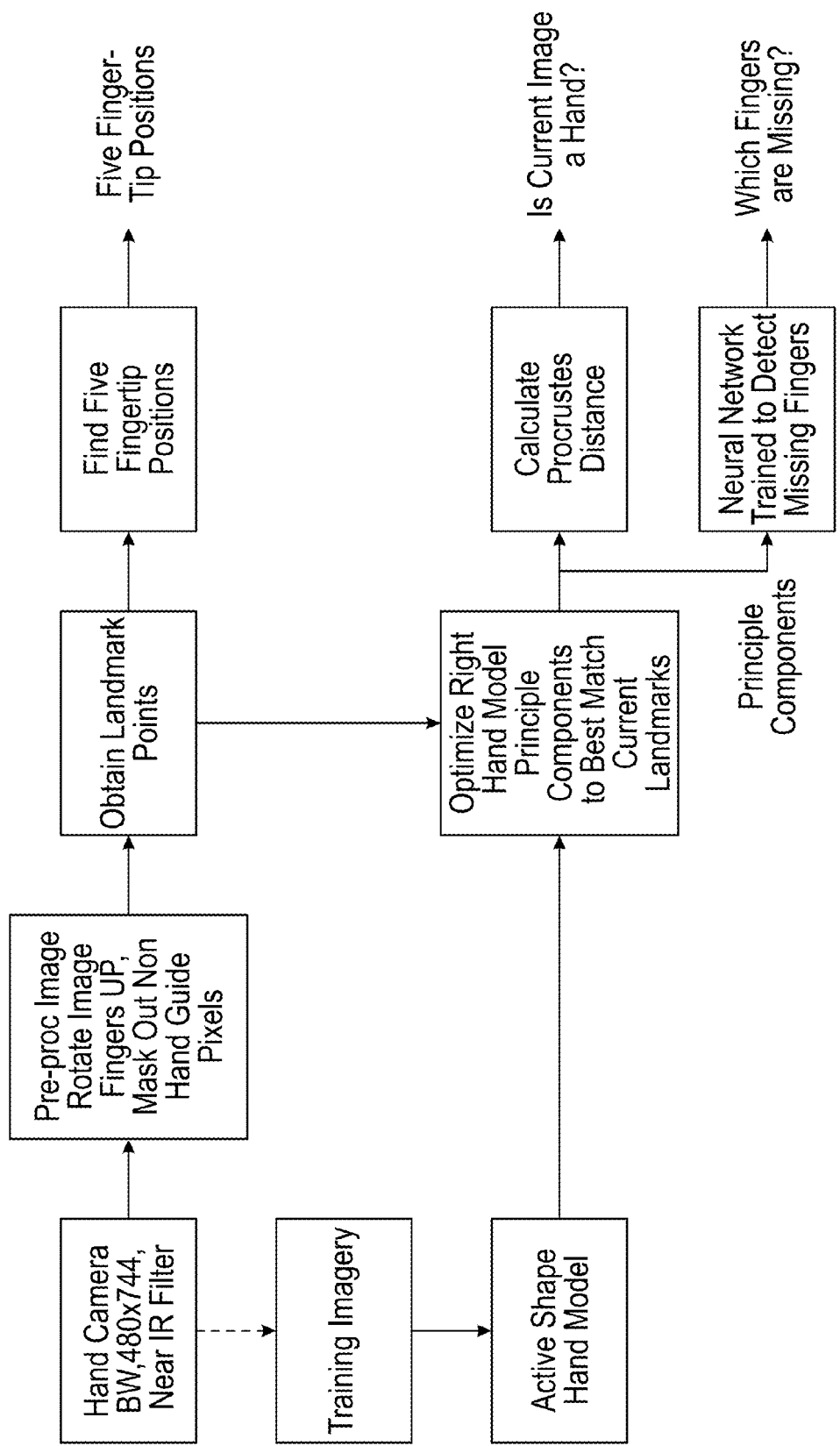
FIG. 7 is a block diagram of an example hand camera control and processing algorithm.
Figure 8A:
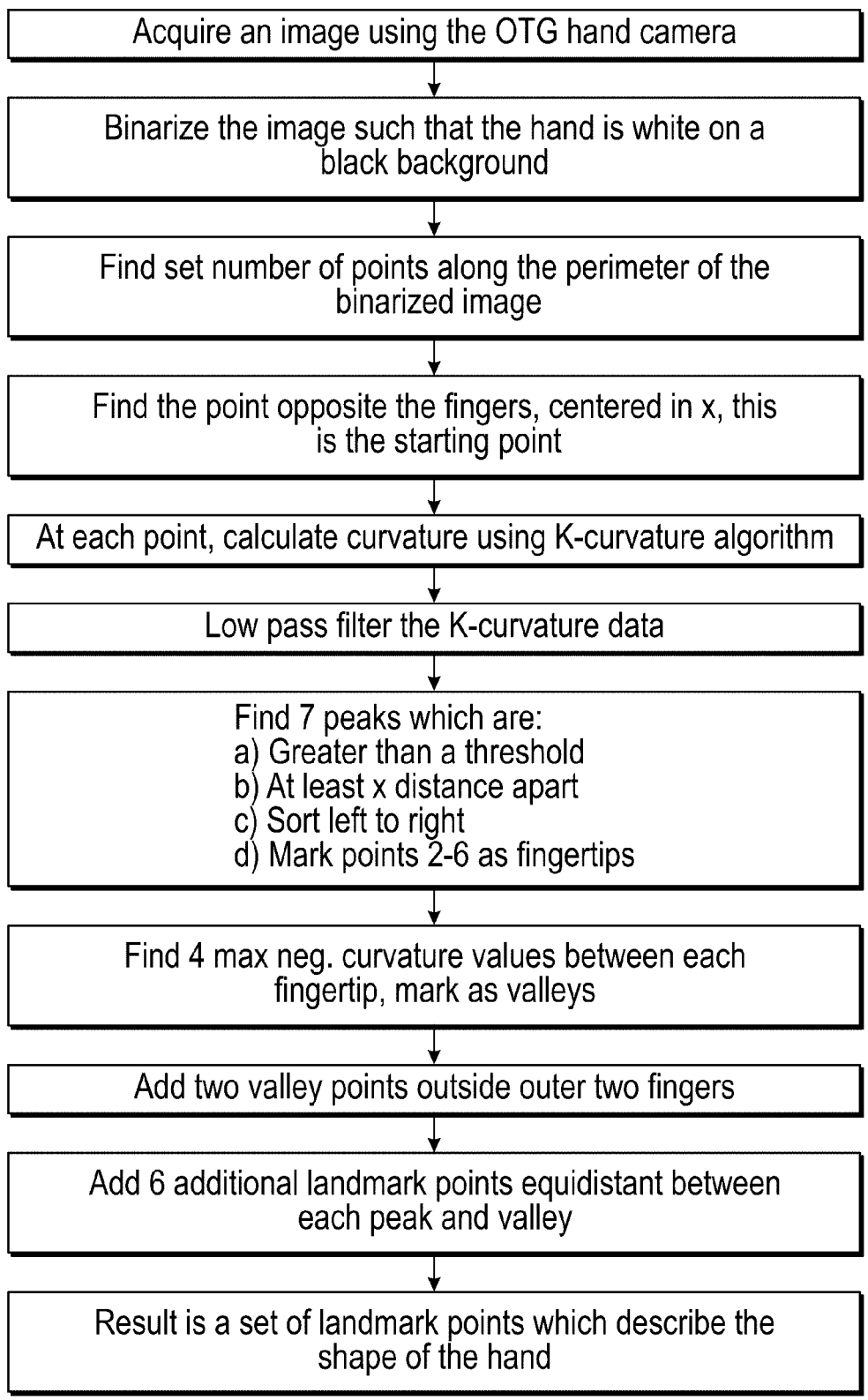
FIG. 8A is a block diagram of an example hand camera control and processing algorithm utilized to find a set of landmark points for a new image.
Figure 8B:
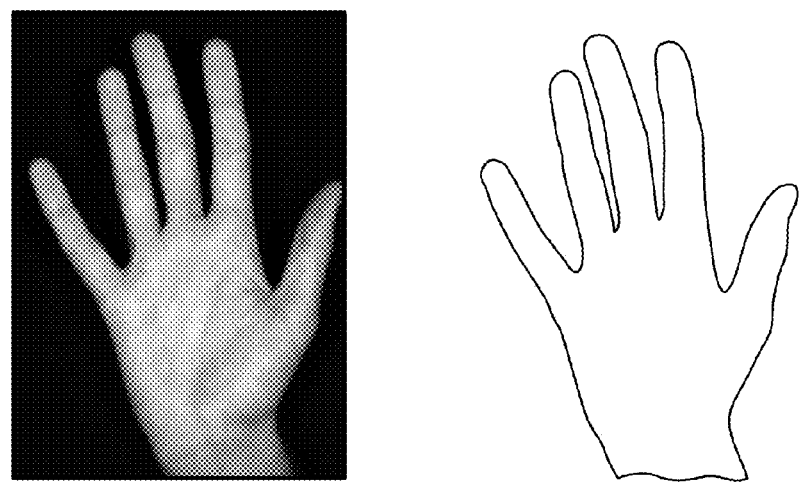
FIG. 8B is an example of a binarized image of a hand as used in the block diagram of FIG. 8A.
Figure 8C:
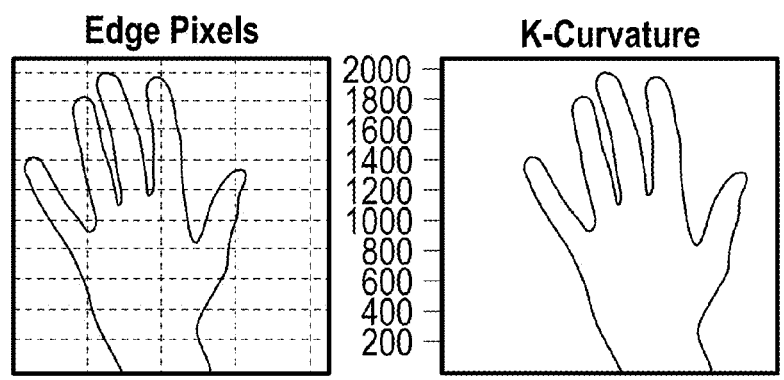
FIG. 8C is an example landmark point and k-curvature rendering as used in the block diagram of FIG. 8A.
Figure 8D:
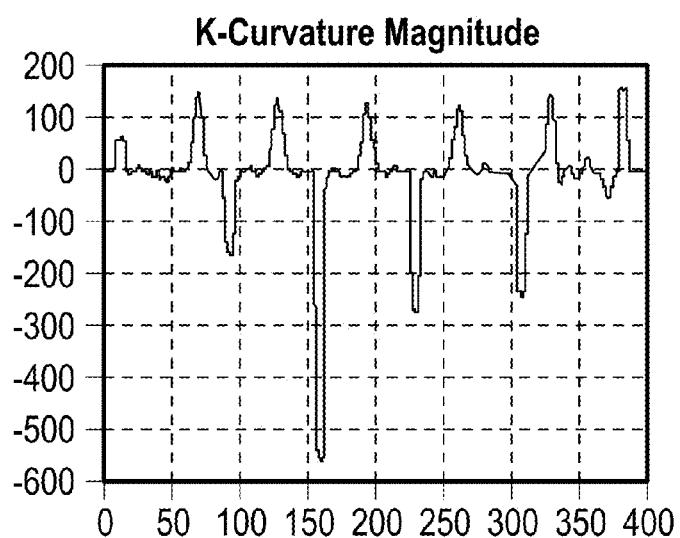
FIG. 8D is an example k-Curvature Magnitude chart as used in the block diagram of FIG. 8A.
Figure 9:
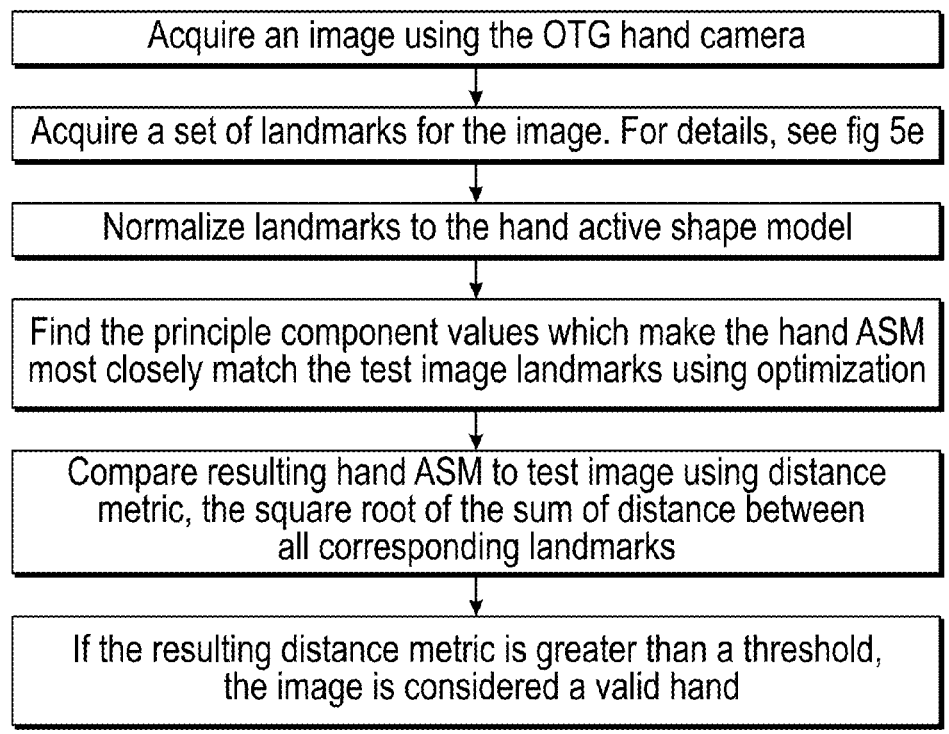
FIG. 9 is a block diagram of an example hand camera control and processing algorithm applying an Active Shape Model to a new image.
Figure 10A:
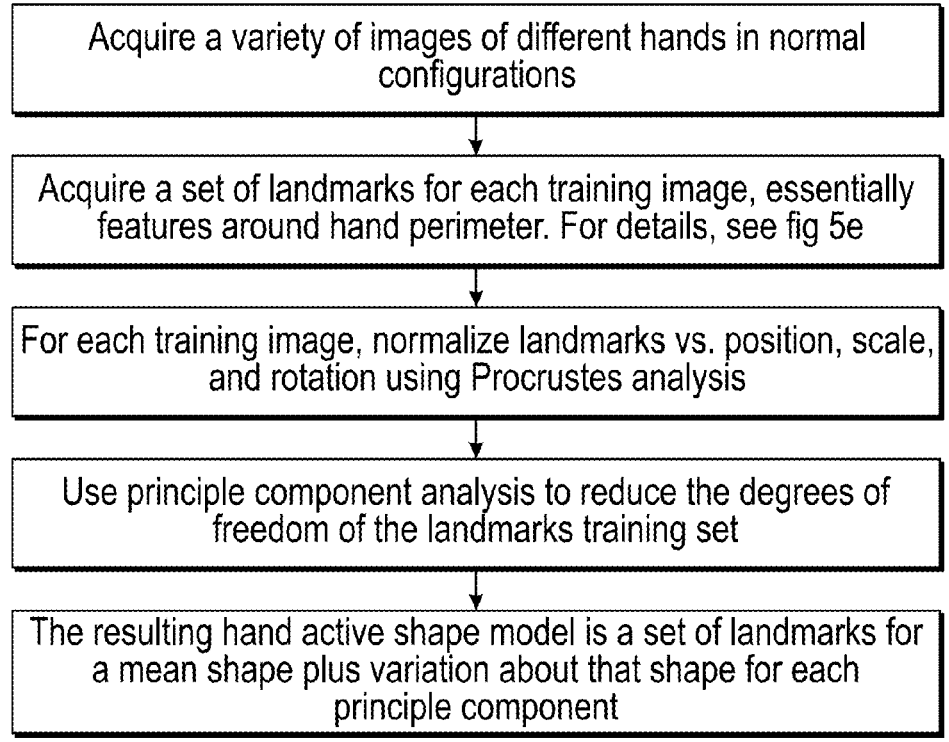
FIG. 10A is a block diagram of an example hand camera control and processing algorithm to train an Active Shape Model.
Figure 10B:
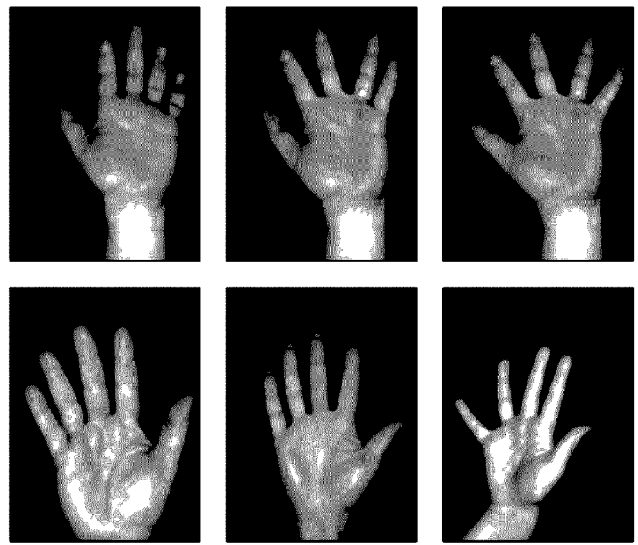
FIG. 10B is an example array of training images for use in the block diagram of FIG. 10A.
Figure 10C:
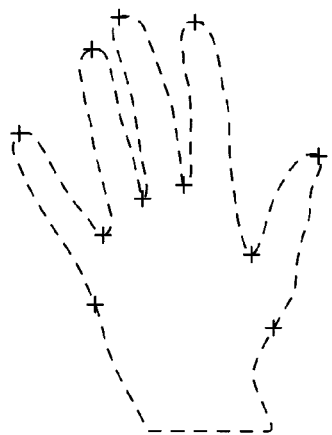
FIG. 10C is an example landmarks for use in the block diagram of FIG. 10A.
Figure 11:
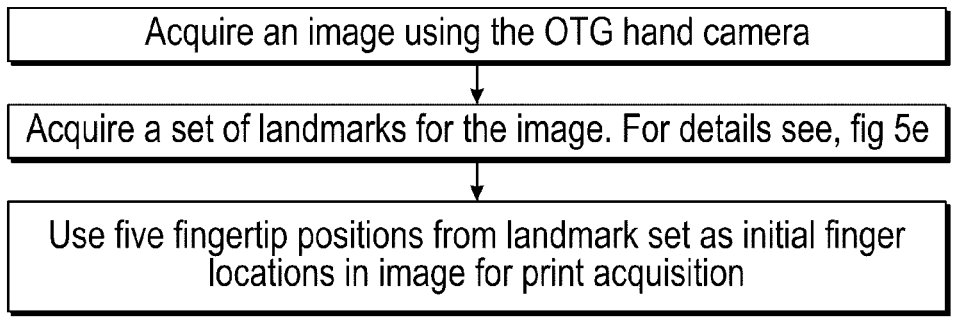
FIG. 11 is a block diagram of an example hand camera control and processing algorithm to determine finger positions.
Figure 12:
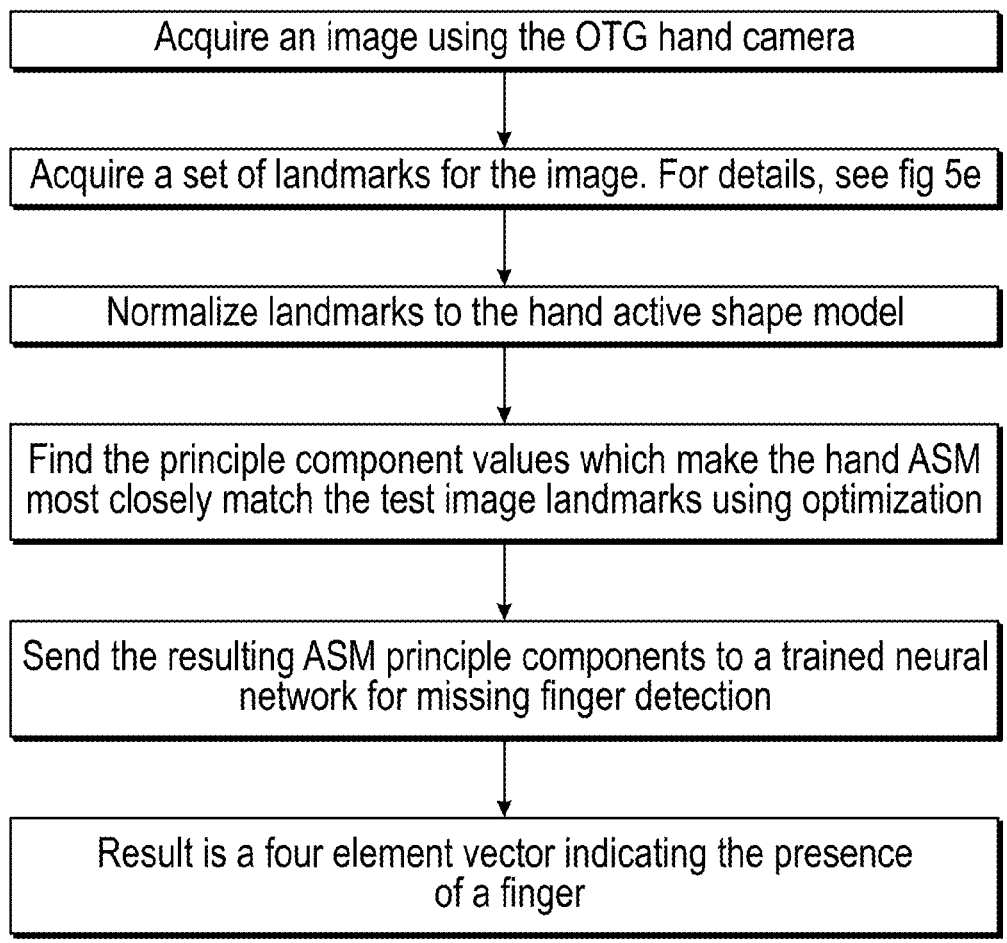
FIG. 12 is a block diagram of an example hand camera control and processing algorithm to detect missing fingers.
Figure 13:
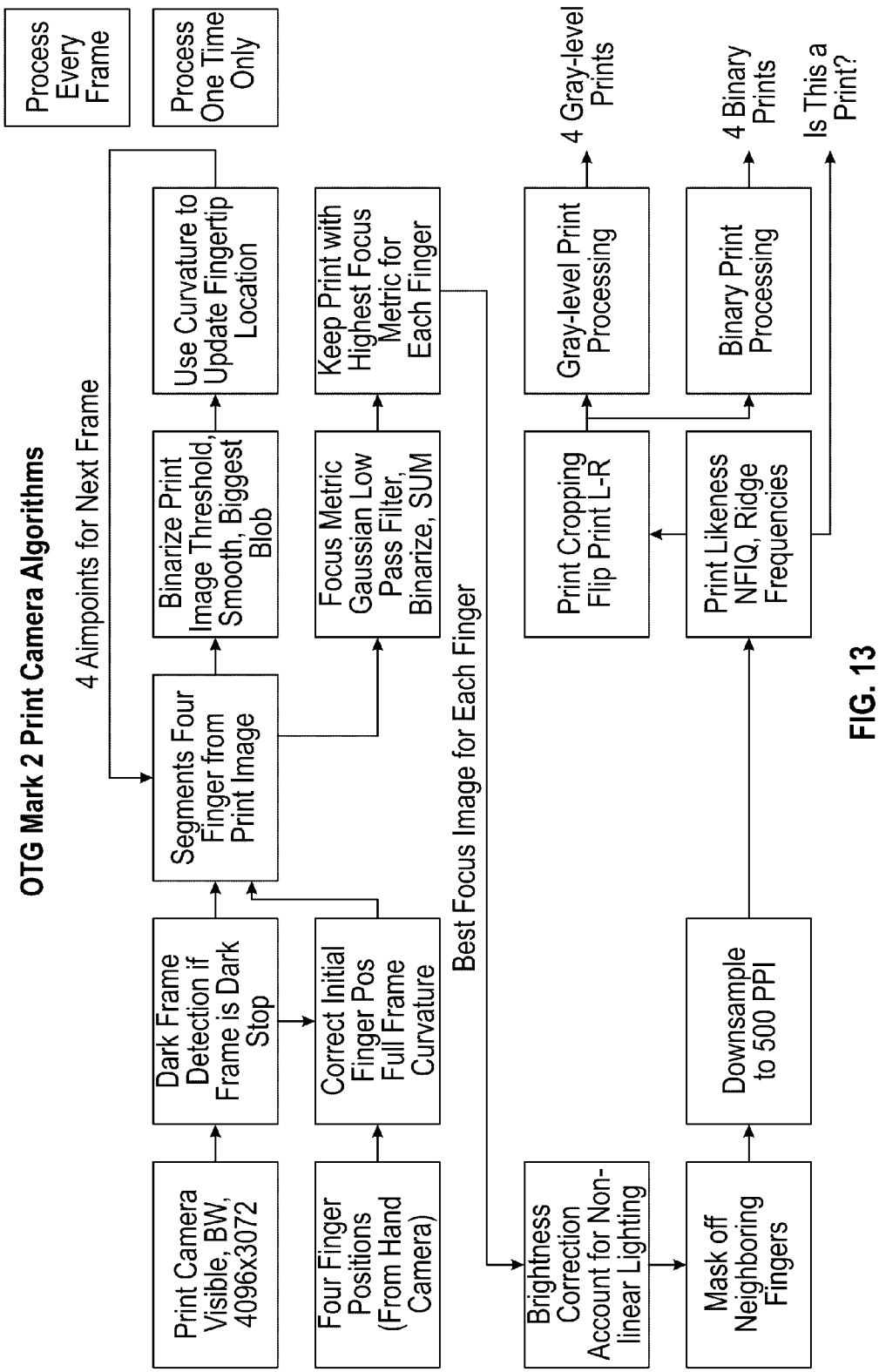
FIG. 13 is a block diagram of an example fingerprint camera control and processing algorithm.
Figure 14A:
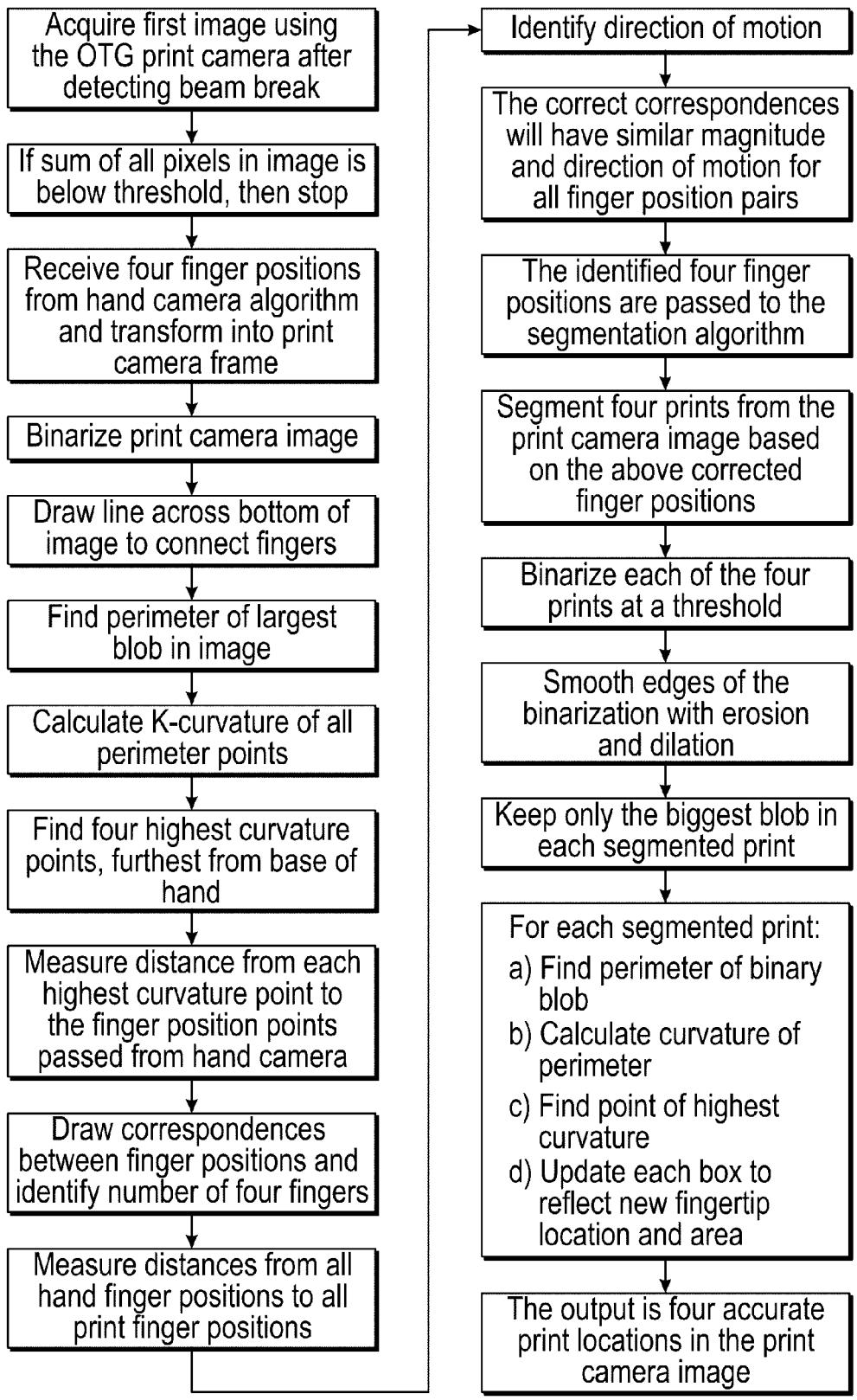
FIG. 14A is a block diagram of an example fingerprint camera control and processing algorithm for finding the location of the four fingerprints in the first fingerprint camera image.
Figure 14B:
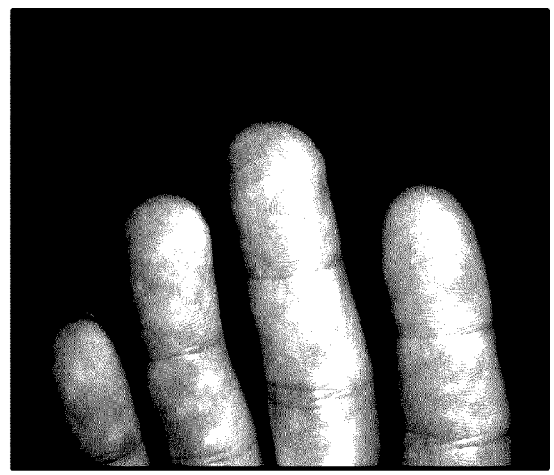
FIG. 14B is an example image used in the block diagram of FIG. 14A.
Figure 14C:
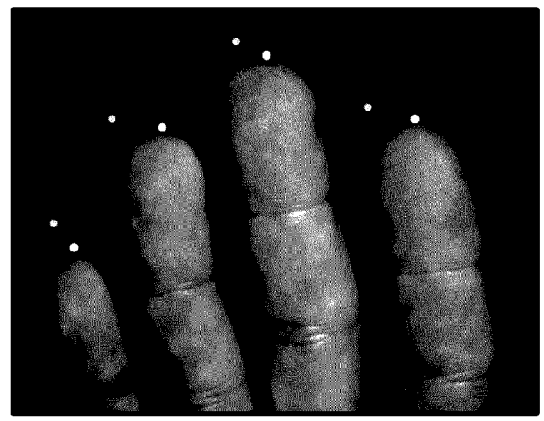
FIG. 14C is an example image used in the block diagram of FIG. 14A.
Figure 14D:
FIG. 14D is an example image used in the block diagram of FIG. 14A.
Figure 15A:
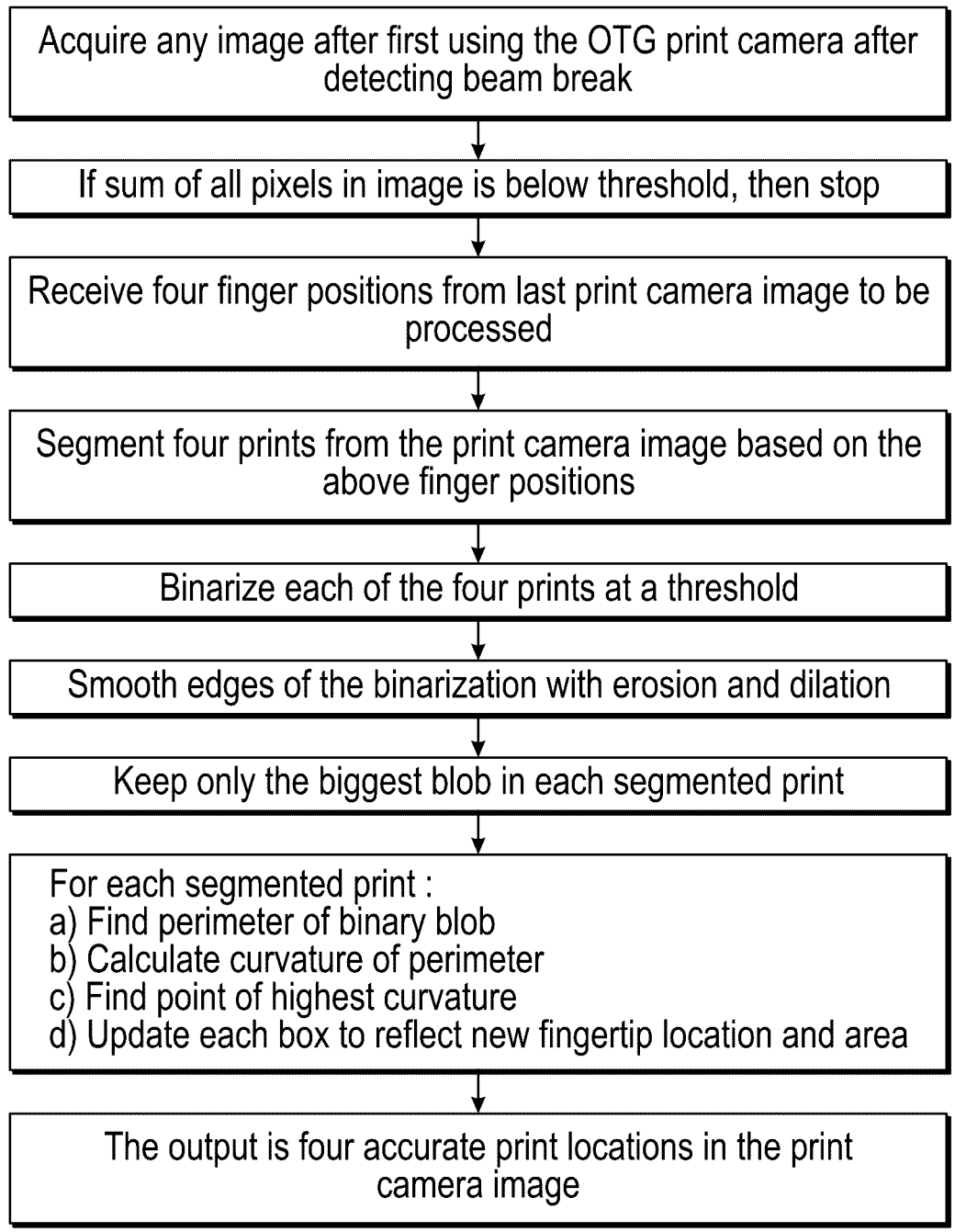
FIG. 15A is a block diagram of an example fingerprint camera control and processing algorithm for finding the location of the four fingerprints in the subsequent fingerprint camera images.
Figure 15B:
FIG. 15B is an example image used in the block diagram of FIG. 15A.
Figure 15C:
FIG. 15C is an example image used in the block diagram of FIG. 15A.
Figure 16A:
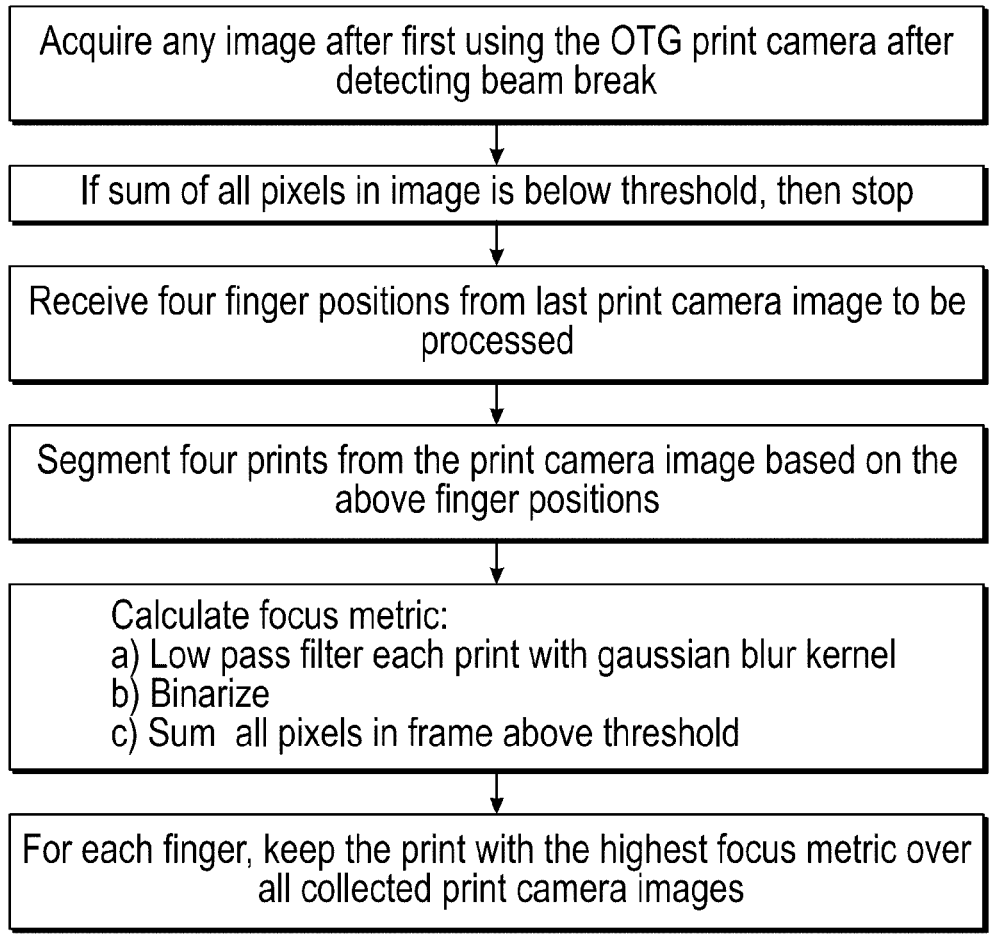
FIG. 16A is a block diagram of an example fingerprint camera control and processing algorithm for finding the highest focus print for all four fingers.
Figure 16B:
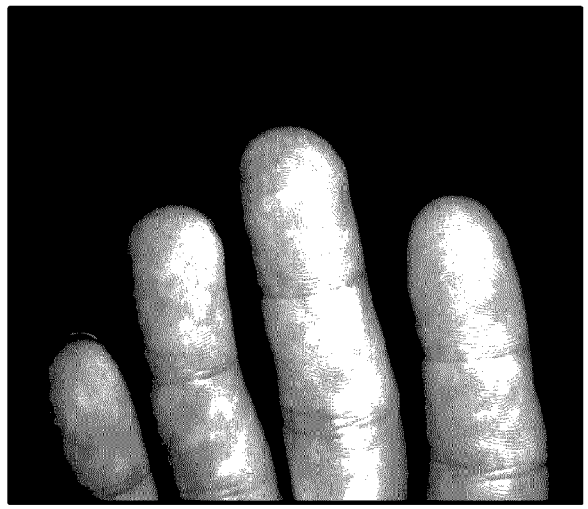
FIG. 16B is an example image used in the block diagram of FIG. 16A.
Figure 17A:
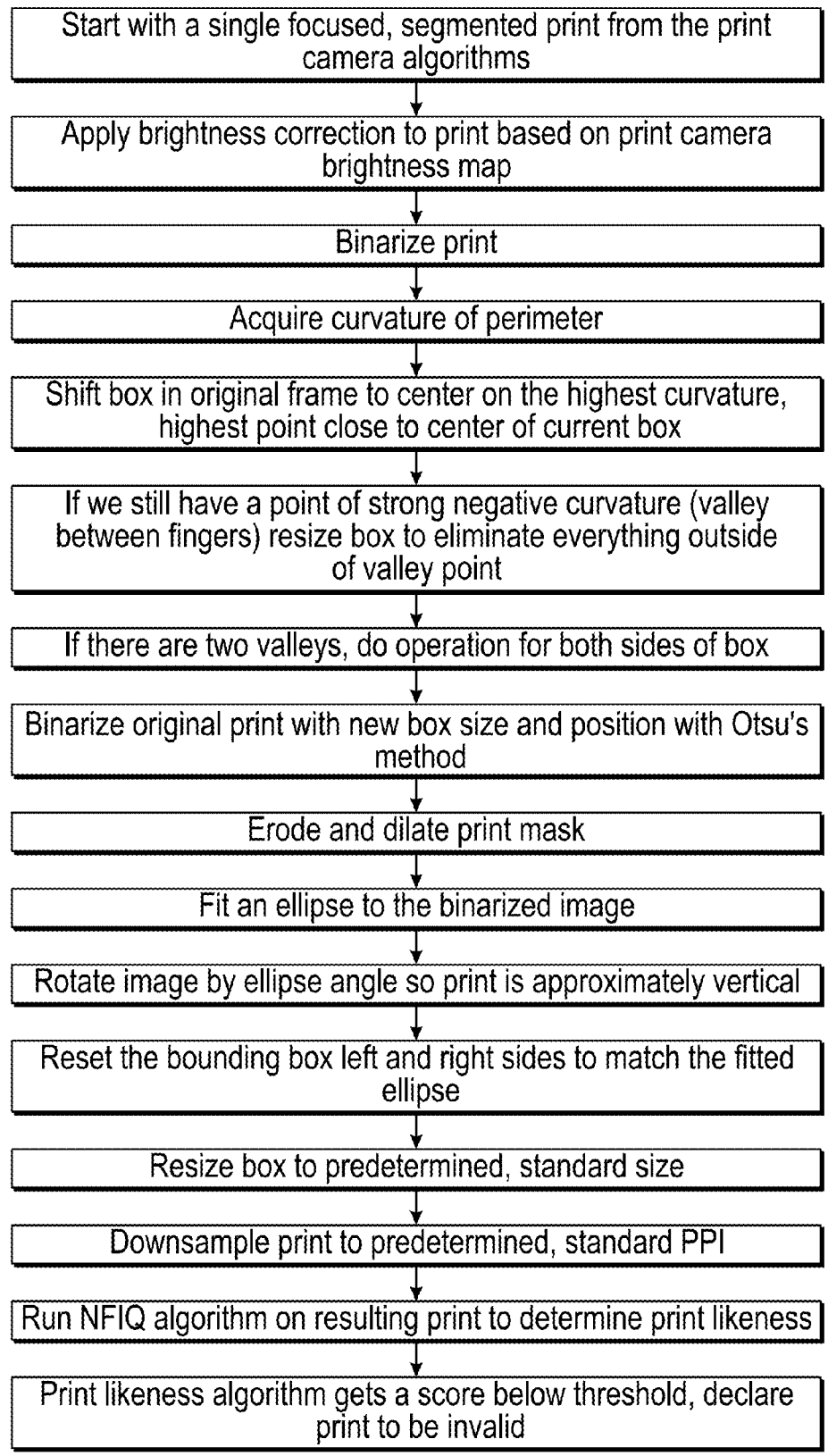
FIG. 17A is a block diagram of an example fingerprint camera control and processing algorithm for determining whether the print is a valid fingerprint.
Figure 17B:
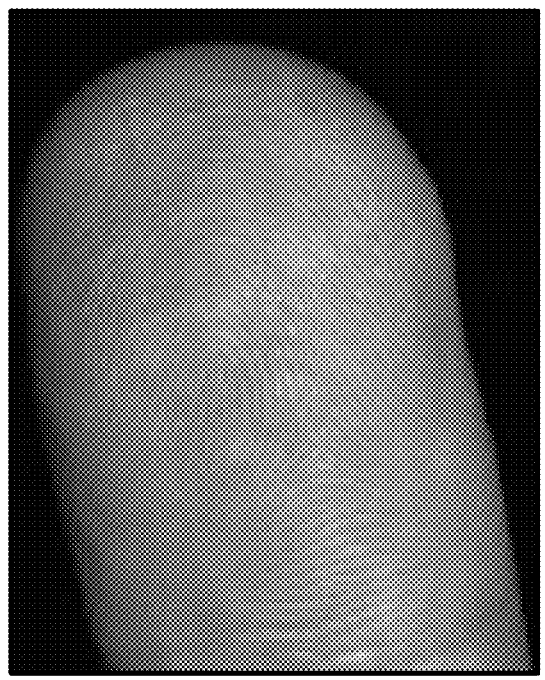
FIG. 17B is an example image used in the block diagram of FIG. 17A.

FIG. 7 illustrates an algorithm used to process the last frame from the hand camera after the beam brake sensor signals an object is in the scanning area. The hand camera acquires a pre-processed image of the object from the last frame of the video image. The system then rotates this image so that the fingers are pointed in an upward direction and masks out any non-hand guide pixels. Next, as described and shown in FIGS. 8A-8D, the system obtains landmark points around the contour of the perimeter of the object. The algorithm automatically selects landmark points around the perimeter, or contour of the object or hand. These landmark points are then—as shown in FIG. 9—compared to a previously trained Active Shape Model of a hand to determine if the acquired object is a hand. An "Active Shape Model" is a set of landmarks for a mean hand shape plus variation about that shape for each principal component. The "Active Shape Model" can be preprogramed into the system, or can be created using the hand camera as described in FIGS. 10A-10C. Furthermore, as shown in FIG. 11, the landmark points also define the locations of the fingertips that are communicated to the Print Camera algorithms. Lastly, such as is described in FIG. 12, the algorithm inputs landmark points into a previously trained neural network to determine if any missing fingers are present.

The neural network takes as input the principal components acquired while fitting the Active Shape Hand Model to the current image landmarks. The output of the neural network is a four element vector indicating if each finger is present or not. The algorithm assumes that a finger substantially shorter than normal is "missing." As mentioned, the on-the-go scanner can use a neural network, or multiple neural networks, to determine if any missing fingers are present in the hand camera image. In some aspects, though, another way this determination can be made is if the processed fingerprint is exceptionally poor, then the finger might be missing.

Training the neural network requires using a large set of training imagery. The training imagery can be captured using the hand camera, or can be preloaded into the system. As shown in FIG. 10B, the training imagery can consist of as many different people's hands as possible. The hands should be of normal (no missing fingers) as well as missing fingers. Missing fingers can be simulated by bending a particular finger down so it appears much shorter. Fingers should also be spread as well as merged for a variety of hand configurations. Typically, the training imagery is run through a landmark detection algorithm as well as a hand model fitting algorithm to create a ten element primary component vector for each training image. This vector is the "input". The expected output can be manually annotated from the training imagery. The expected or target output can be a four element vector containing a "0" for a present finger and a "1" for a missing finger. Once the network is trained, it takes a new 10 element primary component input, and then outputs a four element vector indicating finger presence.

As mentioned, during the training of the Active Shape Model for a hand, a large number of hand images are collected. Contours and landmark points are applied to each training image. The collection of landmark points from all training images is processed using Principal Component Analysis. Principal component analysis is a standard statistical technique that can take a collection of correlated variables (the Landmark points) and convert them into a set of linearly uncorrelated variables, also called principal components. Each principal component can be seen as describing a kind of motion a typical hand can do. For example, a single principal component might describe the motion of the thumb. A value of −1 might describe a thumb which is spread far from the hand. A value of +1 might describe a thumb which is up against the pointing finger. Another principal component might describe when the fingers are spread apart, vs. when they are close together. Another principal component might describe a long ring finger, vs. a very short (missing) ring finger. Thus, in some aspects, the principal component analysis does not care about what the data represents, it just finds the relationships between all the data and sorts the data into a minimum number of linearly independent components describing all possible hand positions represented in the training data set. As is described in more detail herein, a ten element primary component vector can be used to describe the motion of hands. Because these ten principal components sufficiently describe the position, configuration, and finger length of a hand, they can be used to train a neural network to detect missing fingers by, for example, dividing the principal component vectors for all of the training images with additional descriptors indicating if a particular finger is missing or not. This is enough information to train the neural network to perform the same task.

Additionally, the fingerprint camera can be configured to operate using the algorithm(s) shown in FIGS. 13-19. For example, the fingerprint camera ("Print Camera") algorithm acquires an image from the fingerprint camera, and fingertip locations from the hand camera algorithm. If the frame is not dark, the prints can be segmented from the image. To determine if the frame is dark ("Dark Frame Detection"), the algorithm determines whether a sum of all pixels is above a threshold. If yes, then the image is passed to the Segmentation Algorithm. If it is below threshold for three consecutive frames, then processing stops.

If the image is passed to the Segmentation Algorithm, the algorithm processes these segmented prints to find a more accurate print location for the next frame to be acquired. The fingerprint image(s) are also evaluated using a focus algorithm. The prints with the highest focus metric are retained for further processing after image acquisition is completed.

Because, in some aspects, the hand camera and fingerprint camera do not capture images at exactly the same time, hand motion perpendicular to the cameras' axis can induces a position error between the hand camera and the print camera finger positions. If the error is too high, it can be difficult to draw correspondences between fingers captured in both cameras. It can be important to draw these correspondences because, for example, the hand camera algorithm is responsible for positively numbering fingers. To account for this position error, the fingerprint camera image(s) are processed in the following way:

1) Acquire image from Print Camera;
2) Binarize image;
3) Draw line across bottom of image to connect fingers;
4) Find perimeter of largest blob in image;
5) Calculate curvature of the perimeter;
6) Find four highest curvature points, furthest from base of hand;
7) Measure distance from each highest curvature point to the finger position points passed from the Hand Camera;
8) Draw correspondences between finger positions and identify number of four fingers;
9) Measure distances from all hand finger positions to all print finger positions;
10) Identify direction of motion; and
11) Correct correspondences should have similar position errors for all fingers.

Additionally, the algorithm can obtain an initial box size that is used for tracking the size of the print and increasing the box size as necessary as the print grows. Further aspects include segmenting the fingers from one another. To do so, the algorithm can receive the four finger positions from the finger position correction algorithm (described above) and then proceeds to segment four prints from the Print Camera image. In some aspects, the segmented image can have a box size of about 512×768.

These segmented prints can then be passed to the Binarize Print Image block as well as the Focus Metric block. The Binarize Print Image block and the next in the chain can further refine the actual position of each print so that a good segmentation can be performed even in the presence of noise, bad lighting, and neighboring fingers. Binarization of the print involves the following steps:
1) Binarize print image at a threshold;
2) Smooth edges of the binarization with erosion and dilation; and
3) Keep only the biggest blob, assumed to be the print.

Additionally, the algorithm can use curvature to again update the fingertip location in each image. To that end, the algorithm further processes the processing began by the binarization process by performing the following steps:
1) Find perimeter of binary blob;
2) Calculate curvature of perimeter;
3) Find point of highest curvature; and
4) Update box to reflect new fingertip location and area.

As mentioned, the algorithm can additionally apply a focus metric. The purpose of this block is to find the single frame that contains the best focused print for each of the four fingers. Each segmented print is processed in the following way to create four focus metrics for each Print Camera image:
1) Low Pass filter each segmented print with a Gaussian blur kernel;
2) Binarize; and
3) Sum all pixels in frame above threshold to create focus metric.

In some aspects, the algorithm can retain only the image that has the highest focus metric for each finger identified. That is, if there are 4 fingers present, the image having the highest focus metric for each individual finger may be one image or could be up to four images. In some aspects, the algorithm stores in memory all of focus metric scores for each print segmentation, and a processor then compares the metrics and keeps the highest one for each finger. When image acquisition stops, this block outputs the four prints that have the highest focus metrics for that finger. These four focused prints are passed to the next section of the Print Camera algorithm for post processing. Additionally, this block can also keep track of when to stop image acquisition, stopping acquisition when the peak focus point of all fingers has been acquired. For example, the algorithm can 1) set a flag when an increase in focus has been detected for a single finger, and 2) stop image acquisition when focus decreases for all fingers three consecutive frames.

In some aspects, the algorithm further processes the image(s) having the highest focus metric as described. In many cases, the lighting used to illuminate the four fingers is not perfect. Therefore, during calibration of the on-the-go fingerprint scanners and methods described herein, a brightness map can be acquired of the lighting. This brightness map can then be used to calculate a brightness correction. Essentially, darker areas of the image(s) are gained up so that they approximately match the exposure of the bright areas.

Additionally, the algorithm can mask off neighboring fingers that do not belong to the individual print being created (i.e., if focusing on the index finger, the pinky finger can be masked off). For example, if fingers are close together, this block can remove any parts of neighboring fingers currently in the segmented print. This block can also resize the print window to better fit the particular finger. The following processing can be performed:
1) Binarize;
2) Acquire curvature of perimeter;
3) Shift box in original frame to center on the highest curvature, highest point close to center of current box;
4) If we still have a point of strong negative curvature (valley between fingers) resize box to eliminate everything outside of valley point;
5) If there are two valleys, do operation (4) for both sides of box;
6) Binarize original print, with new box size and position with Otsu's method;
7) Erosion and Dilation of print mask;
8) Fit an ellipse to the thresholded image;
9) Rotate image by ellipse angle so that print is approximately vertical;
10) Reset the bounding box left and right sides to match the fitted ellipse; and
11) Resize box to 1 inch in y direction (height) so you don't get too long a finger print.

Additionally, the image(s) can be downsampled to a lower pixel per inch. Image resampling is simply a way to smoothly interpolate the data contained in an image, and optimally produce an image of a different size containing fewer pixels, yet still look the same. Downsampling can be performed by any known method, such as bilinear interpolation, and typical image resampling (i.e., downsampling) algorithms include nearest neighbor, bilinear, bicubic, as well as more advanced algorithms such as Lanczos resampling. The particular PPI that the image is downsampled to is dependent upon the particular application and can be any PPI desired. In some aspects, for example, the image can be downsampled to between about 100 pixels per inch ("PPI") and about 2000 PPI. For example, the image can be downsampled to about 500 PPI.

Furthermore, each print can be evaluated for "print likeness." Print likeness can be evaluated using a variety of methods, including but not limited to an NFIQ score and a simplified ridge frequency detection algorithm. "NFIQ" is a complex algorithm that takes into account more aspects of the print ridges. Because of this complexity, it is better at excluding non-finger-like objects than other methods. These objects might be the wrong side of the hand, a band-aid obscuring the actual print, or an intentionally smudged finger. In some aspects, all prints receiving an NFIQ score of 5 are marked as "Not a Print."

The second print-likeness algorithm—the simplified ridge frequency detection algorithm—is based on ridge frequencies. This algorithm is designed to find where in the print segmentation box the print-like object actually is. This location can be used for things like refining the print segmentation, and excluding long fingernails. The ridge frequency algorithm performs the following steps.
1) Divide print box into blocks;
2) Perform a single row and single column FFT;
3) Create mask containing all blocks with particular box to frequency ratio; and
4) Erode mask.

Finally, each print is processed for both binary and grey-level output. Prior to creation of grey-level and binary prints, however, each print is cropped and centered. To do this, the algorithm can perform the following steps:
1) Perform binary center of mass adjustment;
2) Cut off all four edges such that new box is 85% of old box size; and
3) Draw ellipse from center to the extents of the box.

At this point the algorithm, in some aspects, also flips all prints from left to right so that the prints match those captured by a traditional print reader.

Figure 19A:
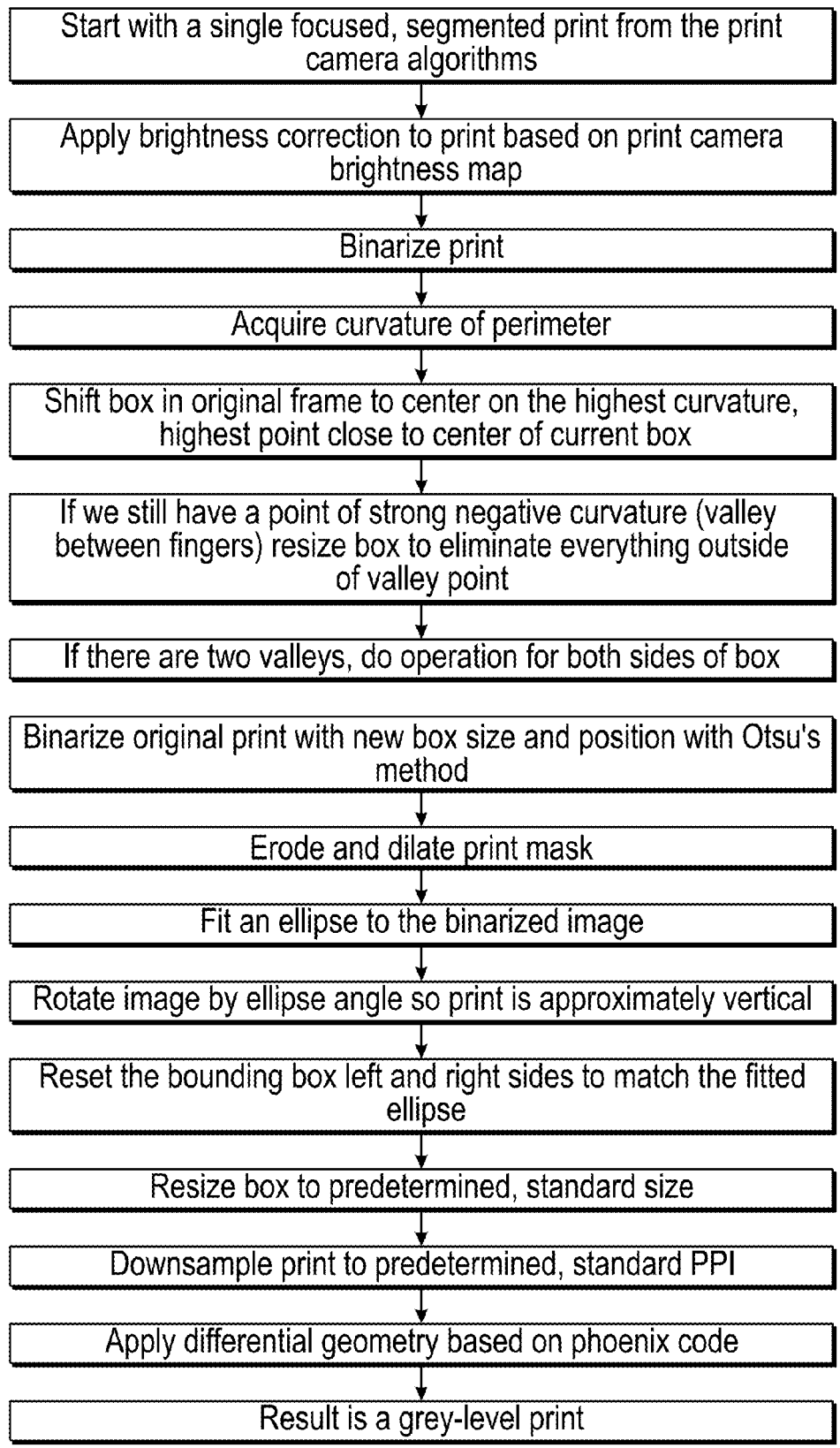
FIG. 19A is a block diagram of an example fingerprint camera control and processing algorithm for creating a grey-level print.
Figure 19B:
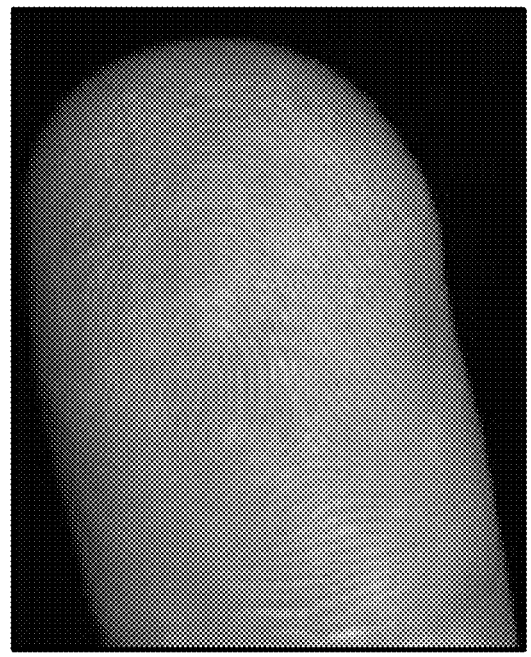
FIG. 19B is an example image used in the block diagram of FIG. 19A.
Figure 19C:
FIG. 19C is an example grey-level print produced with the block diagram of FIG. 19A.

Grey-level (or "gray-level") processing can be performed to create a desired grey-level fingerprint output (such as that shown in FIG. 6 and FIG. 19C). Grey-line processing can be performed in any manner suitable. For example, a suitable processing method includes:

1) Locally normalize raw grayscale print image;
2) Mask with binary print;
3) Invert polarity; and
4) Enhance contrast.

Figure 18A:
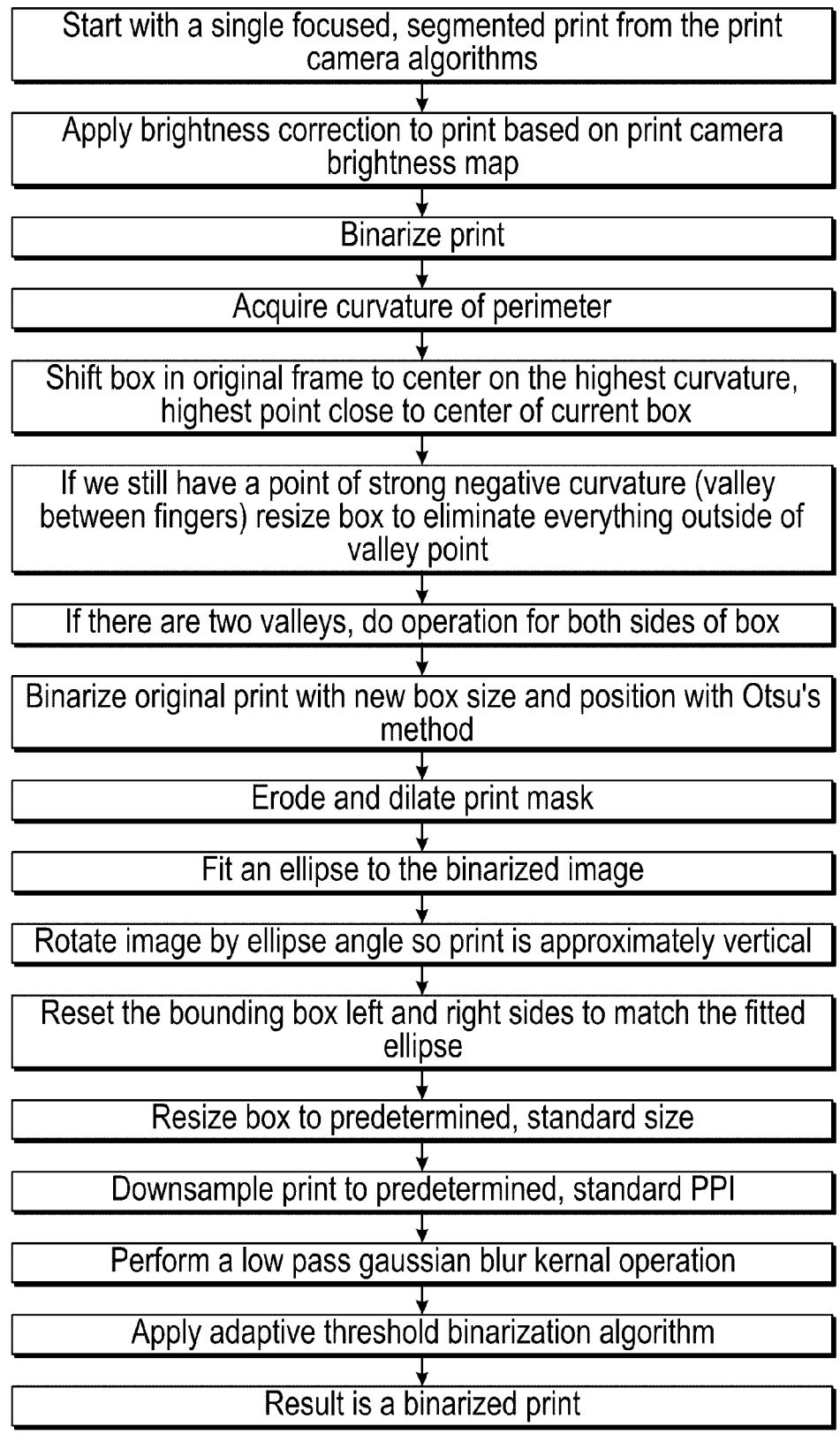
FIG. 18A is a block diagram of an example fingerprint camera control and processing algorithm for creating a binary print.
Figure 18B:
FIG. 18B is an example image used in the block diagram of FIG. 18A.
Figure 18C:
FIG. 18C is an example binary print produced with the block diagram of FIG. 18A.

Alternatively or additionally, the image(s) can be processed to form binarized prints, such as is shown in FIG. 6 and FIG. 18C. Just as with grey-level prints, any suitable method can be used to produce binarized prints. For example, a baseline method or an optional method can be utilized. In some aspects, a baseline method includes utilizing 1) a low pass Gaussian blur, and 2) adaptive threshold binarization. An optional method includes utilizing:

1) A low pass Gaussian blur;
2) Local normalization;
3) Adaptive threshold binarization with standard deviation offset; and
4) Median blur.

Finally, once either grey-level or binarized prints are obtained, the scanner can output said prints to an output device or user. Alternatively, the scanner can cross-reference the prints against a database of known biometric data—including fingerprints—to either obtain the identity of the subject or otherwise provide or obtain information about the subject. Additionally, the scanner can build a local database of prints and other biometric and identifying data. For example scanners can be utilized to confirm security access to buildings and other secured areas, confirm that the identity of a passenger is the same as the identity corresponding to a particular ticket, act as a form of identification or payment wherein the payment information (i.e., bank account and routing numbers) are keyed to your individual fingerprints, or any other application where a set of data is cross-referenced or checked against a scanned fingerprint.

Figure 20:
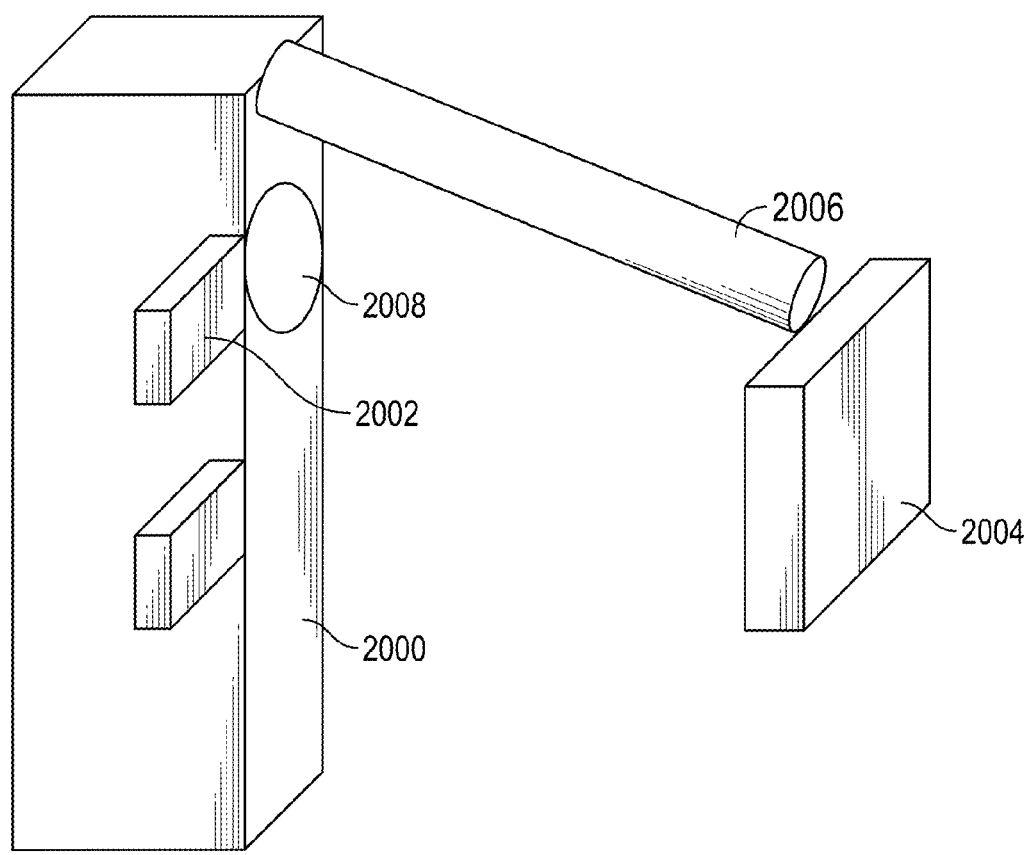
FIG. 20 is a schematic of an example on-the-go fingerprint scanner.

FIG. 20 shows an on-the-go fingerprint scanner having a frame 2000 holding beam break sensor 2002 that is replaced with a mirror 2004, held in place by a mounting apparatus 2006. The beam break sensor 2002 is now located on frame 2000, and optical, imaging subsystem 2008 (including the illumination system, hand camera, and fingerprint camera) is in accordance with the above description. A person of ordinary skill will understand that the mounting apparatus 2006 could be any of a number of configurations, in addition to that shown.

As before, in use, the beam break sensor 2002 initiates the operation. Instead of a direct optical path from optical subsystem 2008 to the hand, mirror 2004 reflects the optical path back to the location of beam break sensor 2002, now located close to optical subsystem 2008. The lighting system, fingerprint camera, and hand camera systems all perform as described above.

Furthermore, in this aspect, there are no active devices, electronics, or power requirements in the auxiliarly frame; mirror 2008 is passive. Mirror 2004 is located at approximately half (½) the distance that hand break sensor 2002 was located in the aspects described above. Alternately, mirror 2008 can be placed further away, allowing increased focal length of fingerprint camera and increased depth of field. Alternately, the mounting apparatus 2006 can provide a folding operation to allow a more compact non-operational mode, for ease in transportation, or to reduce footprint when not operating. The mounting apparatus should, however, provide a stable positioning of the mirror, which can be provided by a variety of means.

With respect to the above description, it is to be realized that the optimum composition for the parts of the disclosure, to include variations in components, materials, shape, form, function, and manner of operation, assembly and use, are deemed readily apparent and obvious to one skilled in the art, and all equivalent relationships to those illustrated in the examples and described in the specification are intended to be encompassed by the present invention. It should be understood that the accompanying drawings are illustrative in nature and embodiments other than those shown may exist. Further, various modifications may be made of the disclosure without departing from the scope thereof, and it is desired, therefore, that only such limitations shall be placed thereon as are imposed by the prior art and which are set forth in the appended claims.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or "an" should be read as meaning "at least one," "one or more" or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other such as phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The above description is provided to enable any person skilled in the art to make or use the present invention. Various modifications to these aspects will be readily apparent to those skilled in the art, and the generic principles defined herein may be applied to other embodiments without departing from the spirit or scope of the invention. Thus, the present invention is not intended to be limited to the embodiments or aspects shown herein but is to be accorded the widest scope consistent with the principles and novel features disclosed herein.

What is claimed is:

1. An on-the-go fingerprint scanner, comprising:
   a scanning area;
   a beam break sensor disposed coincident to the scanning area such that the beam break sensor detects when an object passes through the scanning area;
   at least one hand camera configured to capture a video image of the scanning area such that when the beam break sensor detects that an object has passed through the scanning area, the hand camera:
   acquires an image of the object,
   detects whether the object is a human hand by determining a contour around the perimeter of the object, applying landmark points to the contour, and comparing the contour to a previously trained Active Shape Model of a hand,
   detects a location of any fingers on said detected hand by processing the location of the landmark points, and
   detects the presence or absence of any fingers using a neural network; and
   at least one fingerprint camera configured to receive the location of any fingers within the scanning area from the hand camera and capture a plurality of high-resolution images of at least a portion of any of said fingers passing through the scanning area.

2. The fingerprint scanner of claim 1, wherein the hand camera acquires an image of the object by acquiring a last frame from the hand camera video image after the beam brake sensor detects the presence of the object.

3. The fingerprint scanner of claim 1, wherein the fingerprint scanner is configured to determine a focus metric for each of the plurality of high-resolution images and retain those images with the highest focus metric for further processing.

4. The fingerprint scanner of claim 1, wherein at least one of the plurality of high-resolution images is further processed by at least one of: downsampling the image to 500 PPI, performing a full-frame brightness correction, applying a ridge detection algorithm, processing for both binary and grey level output, or any combination thereof.

5. The fingerprint scanner of claim 1, further comprising:
   an illumination system configured to illuminate an object passing through the scanner area, the illumination system having any of a high-power extended light source, a compound hyperbolic concentrator, a lens, a diffuser, or any combination thereof.

6. The fingerprint scanner of claim 5, wherein the illumination system further includes a baffle.

* * * * *